United States Patent

Kojima

[11] Patent Number: 5,917,955
[45] Date of Patent: Jun. 29, 1999

[54] AREA RECOGNIZING DEVICE AND GRADATION LEVEL CONVERTING DEVICE EMPLOYING AREA RECOGNIZING DEVICE

[75] Inventor: Akio Kojima, Neyagawa, Japan

[73] Assignee: Matsushita Electric Industrial Co., Ltd., Kadoma, Japan

[21] Appl. No.: 08/798,230

[22] Filed: Feb. 11, 1997

Related U.S. Application Data

[62] Division of application No. 08/321,178, Oct. 11, 1994, Pat. No. 5,760,922.

[30] Foreign Application Priority Data

Oct. 8, 1993 [JP] Japan .................................. 5-252853

[51] Int. Cl.$^6$ .............. G04K 9/40; H04N 1/38; H04N 1/40
[52] U.S. Cl. ............... 382/266; 382/254; 382/260; 358/448; 358/458; 358/464
[58] Field of Search ................. 358/448, 455, 358/456, 458, 464, 443, 447; 382/254, 266, 260, 264, 263, 269

[56] References Cited

U.S. PATENT DOCUMENTS

| | | |
|---|---|---|
| 4,758,897 | 7/1988 | Hiratsuka et al. .............. 358/457 |
| 4,841,377 | 6/1989 | Hiratsuka et al. .............. 358/456 |
| 5,231,677 | 7/1993 | Mita et al. .................... 382/266 |
| 5,333,211 | 7/1994 | Kanda et al. .................. 382/264 |
| 5,392,137 | 2/1995 | Okubo ......................... 382/260 |
| 5,454,052 | 9/1995 | Kojima ........................ 382/266 |

FOREIGN PATENT DOCUMENTS 3250975 11/1991 Japan .
451378 2/1992 Japan .

*Primary Examiner*—Thomas D. Lee
*Attorney, Agent, or Firm*—Price, Gess & Ubell

[57] ABSTRACT

A first converting circuit converts K-level image data, and suppresses a diffusion range of data by an N-level converting circuit. The N-level converting circuit converts a K-level image into an N-level gradation image (K>N). An image memory stores the N-level gradation image. An estimating circuit converts the N-level gradation image into an M-level gradation image (N<M). A second converting circuit returns the M-level gradation image into the form before the conversion according to a conversion amount from the first converting circuit. Accordingly, density ripple can be suppressed even in a small scanning aperture. A control circuit sets a conversion table to the first converting circuit and the second converting circuit according to a setting signal from a control panel, and outputs a control signal to the estimating circuit, so that processing mode is set in responsive to different images, and image quality is adjusted.

19 Claims, 28 Drawing Sheets

|  | i-1 | i | i+1 |
|---|---|---|---|
| j-1 | 1 | 2 | 1 |
| j | 2 | 4 | 2 |
| j+1 | 1 | 2 | 1 |

1110 pixel in concern

→ main scanning direction i sub scanning direction j ↓

|  | i-2 | i-1 | i | i+1 | i+2 |
|---|---|---|---|---|---|
| j-2 | 1 | 1 | 1 | 1 | 1 |
| j-1 | 1 | 1 | 1 | 1 | 1 |
| j | 1 | 1 | 1 | 1 | 1 |
| j+1 | 1 | 1 | 1 | 1 | 1 |
| j+2 | 1 | 1 | 1 | 1 | 1 |

1210 pixel in concern

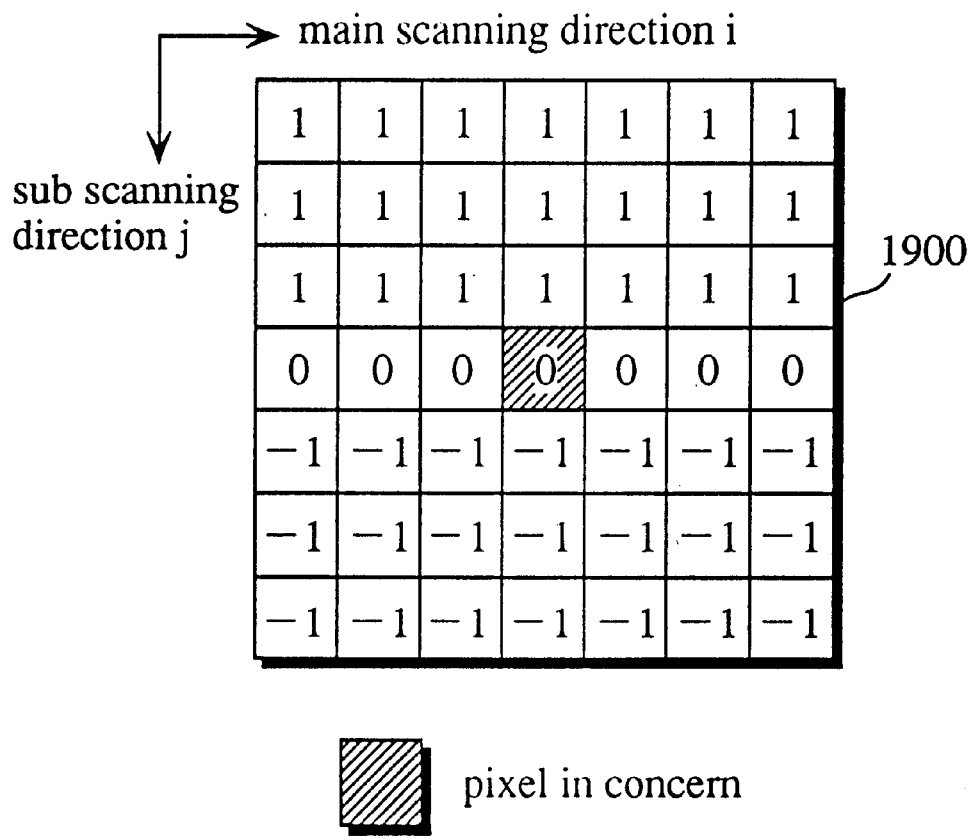

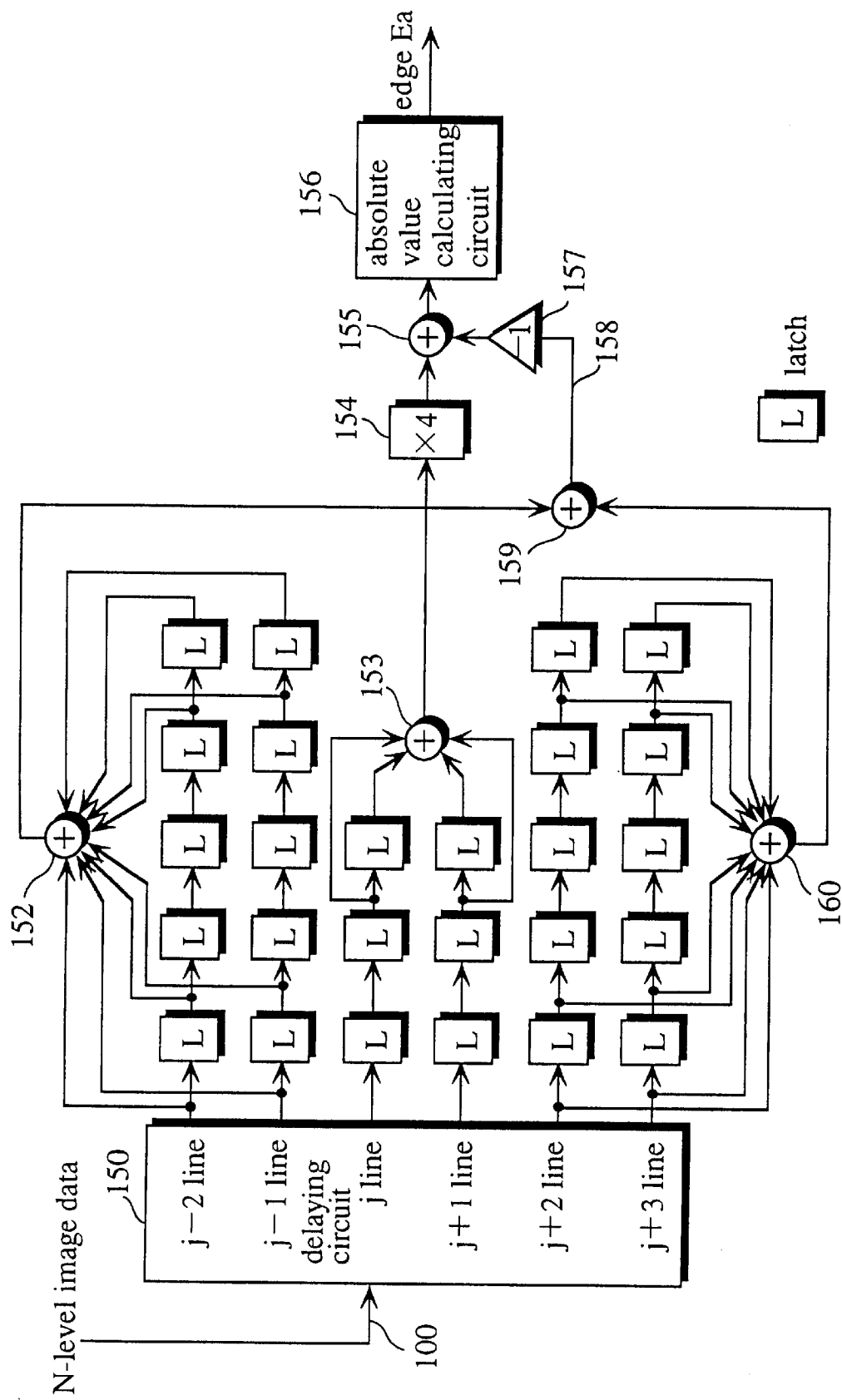

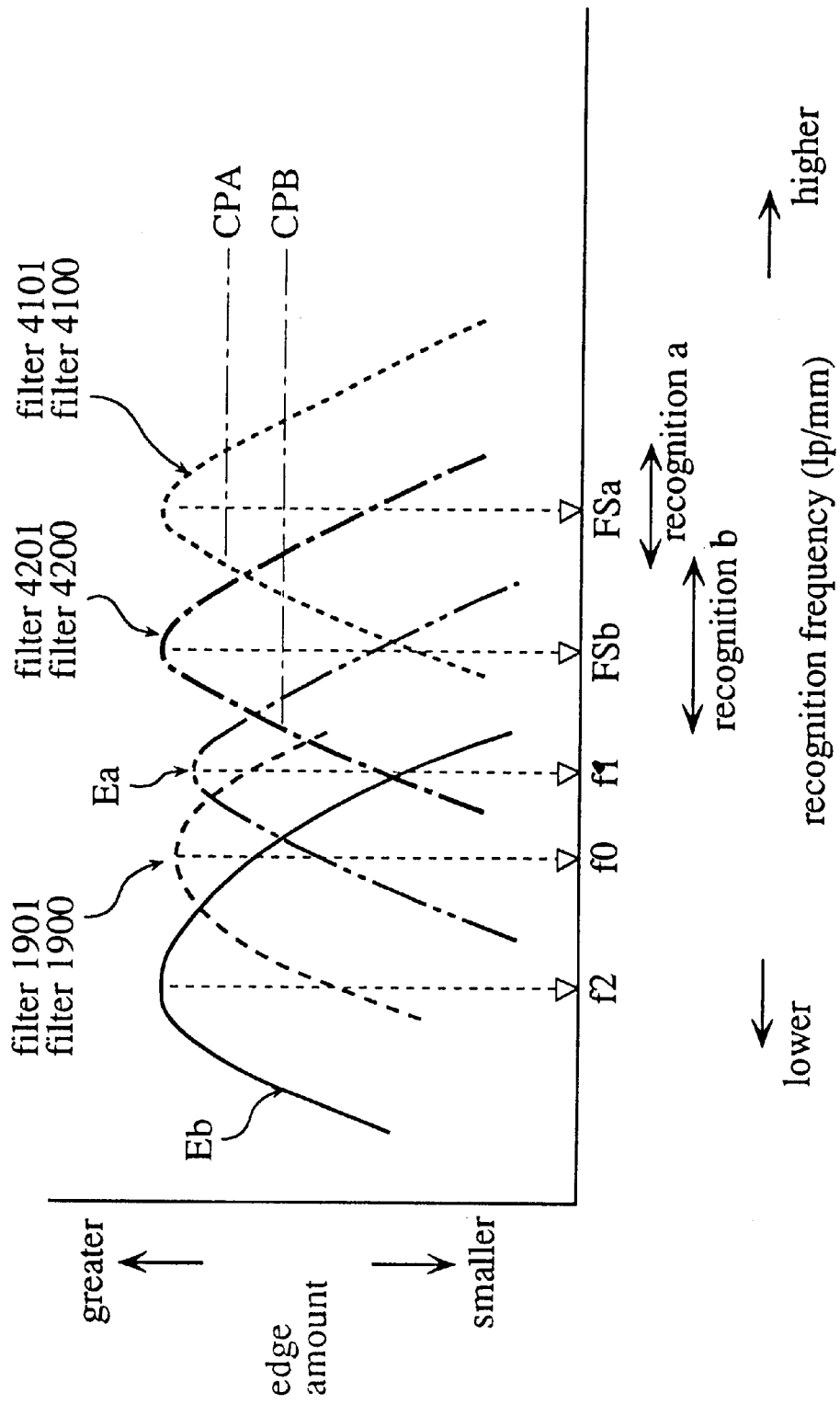

Fig. 10a
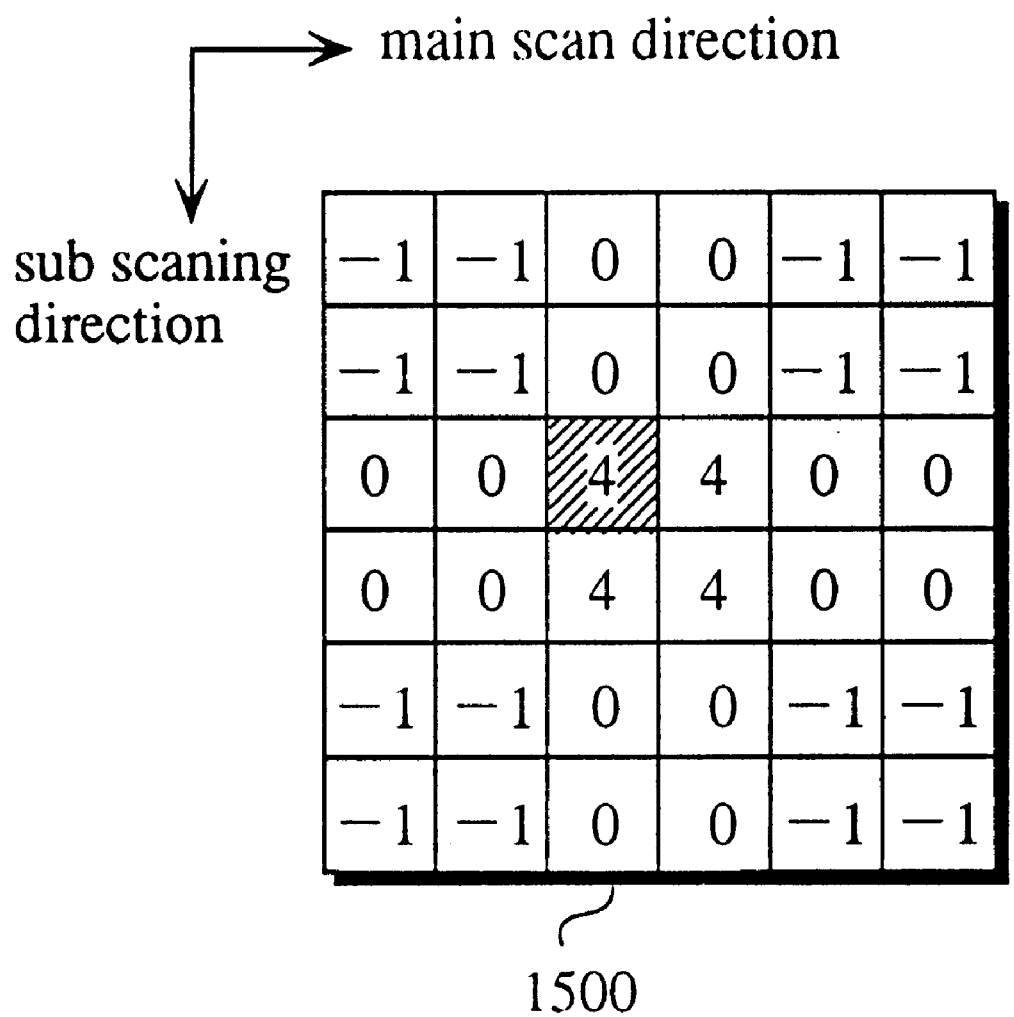
1500
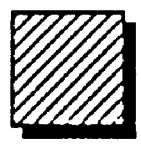 pixel in concern

Fig. 10 (b)

| 1 | 1 | 0 | 0 | −1 | −1 |
|---|---|---|---|----|----|
| 1 | 1 | 0 | 0 | −1 | −1 |
| 2 | 2 | 0 | 0 | −2 | −2 |
| 2 | 2 | 0 | 0 | −2 | −2 |
| 1 | 1 | 0 | 0 | −1 | −1 |
| 1 | 1 | 0 | 0 | −1 | −1 |

1601

| 1 | 1 | 2 | 2 | 1 | 1 |
|---|---|---|---|---|---|
| 1 | 1 | 2 | 2 | 1 | 1 |
| 0 | 0 | 0 | 0 | 0 | 0 |
| 0 | 0 | 0 | 0 | 0 | 0 |
| −1 | −1 | −2 | −2 | −1 | −1 |
| −1 | −1 | −2 | −2 | −1 | −1 |

pixel in concern

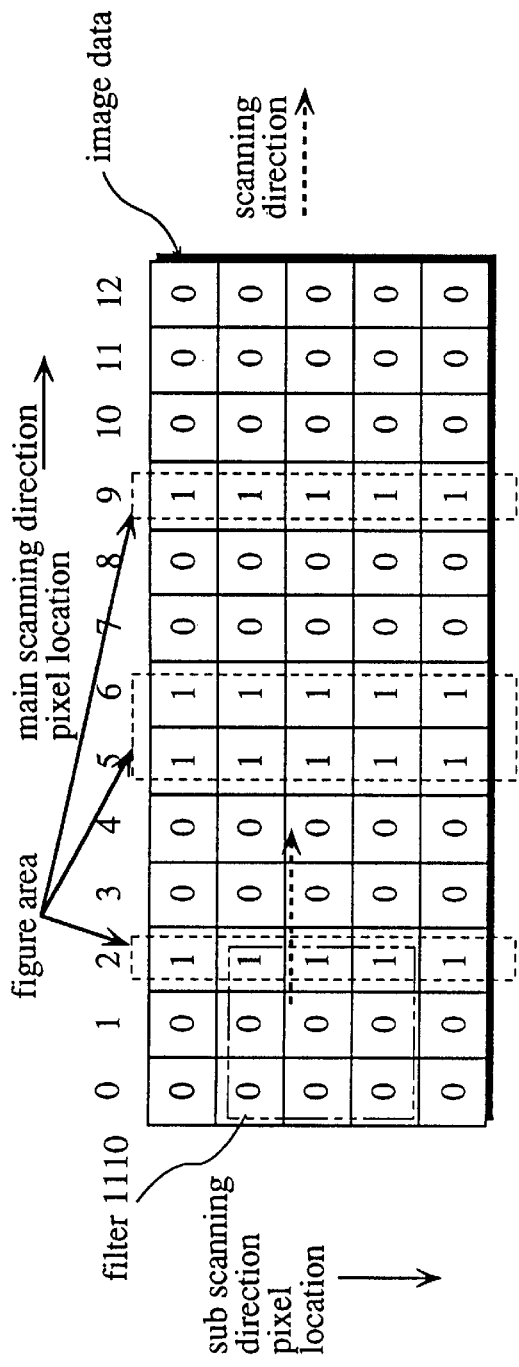
Fig. 14 (a)
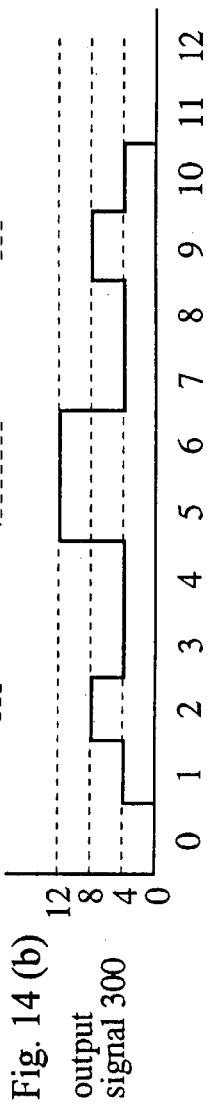
Fig. 14 (b) output signal 300
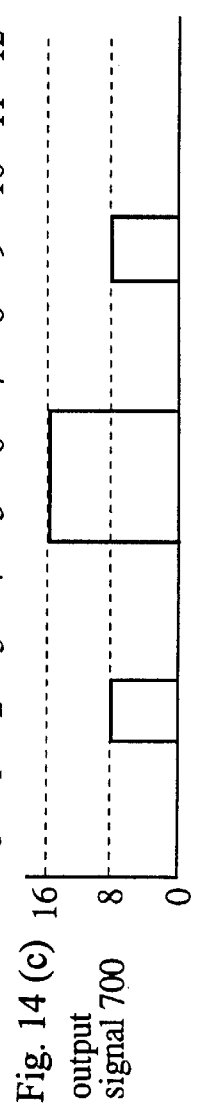
Fig. 14 (c) output signal 700

Fig. 17a
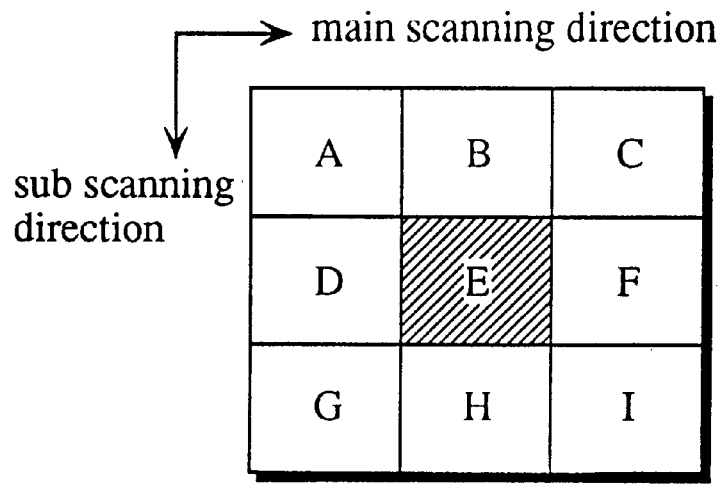
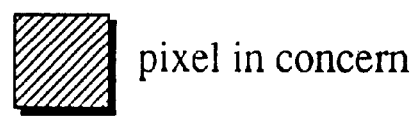 pixel in concern
Fig. 17b
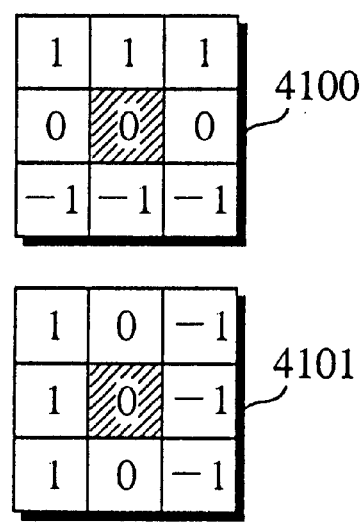

Fig. 17 (c)

|   |   |   |   |   |
|---|---|---|---|---|
| 1 | 1 | 1 | 1 | 1 |
| 1 | 1 | 1 | 1 | 1 |
| 0 | 0 | 0 | 0 | 0 |
| −1 | −1 | −1 | −1 | −1 |
| −1 | −1 | −1 | −1 | −1 |

— 4200

|   |   |   |   |   |
|---|---|---|---|---|
| 1 | 1 | 0 | −1 | −1 |
| 1 | 1 | 0 | −1 | −1 |
| 1 | 1 | 0 | −1 | −1 |
| 1 | 1 | 0 | −1 | −1 |
| 1 | 1 | 0 | −1 | −1 |

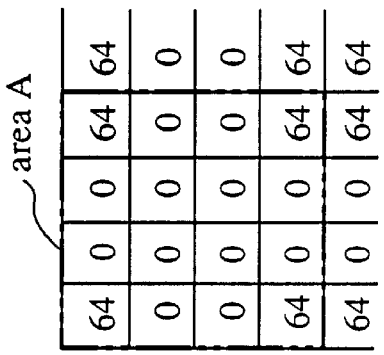
Fig. 23 (a)
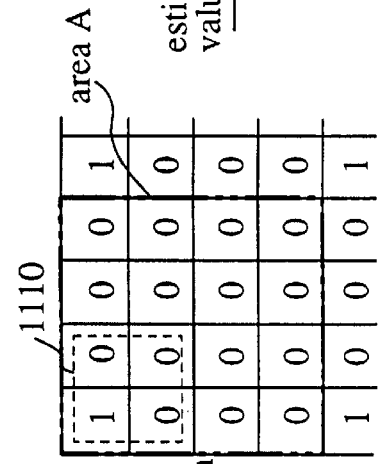
Fig. 23 (b)
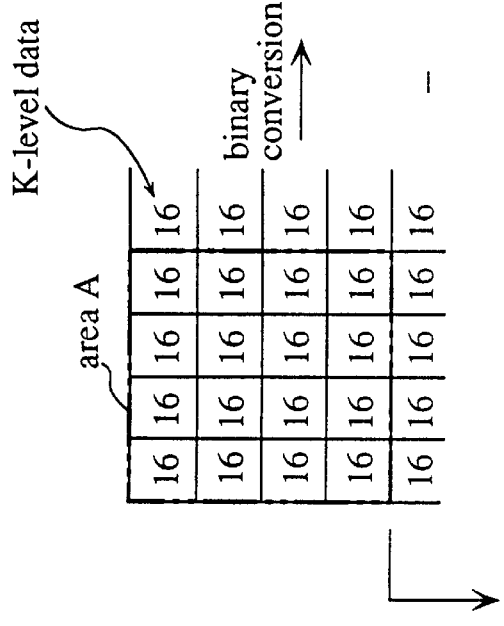
Fig. 23 (c)
Fig. 23 (d)
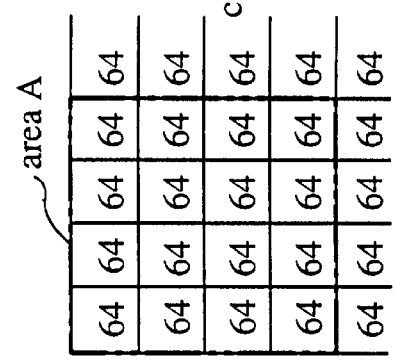
Fig. 23 (e)
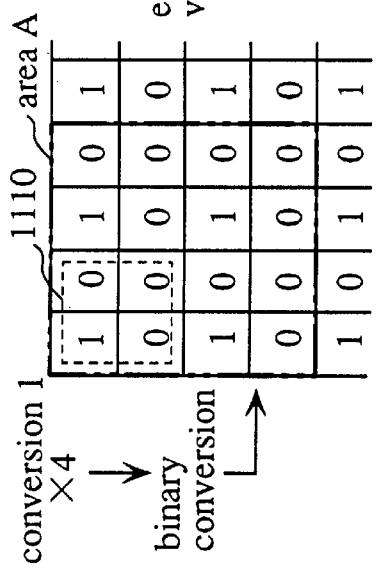
Fig. 23 (f)

AREA RECOGNIZING DEVICE AND GRADATION LEVEL CONVERTING DEVICE EMPLOYING AREA RECOGNIZING DEVICE

This is a division of prior application Ser. No. 08/321,178, filed on Oct. 11, 1994 U.S. Pat. No. 5,760,922 for an AREA RECOGNIZING DEVICE AND GRADATION LEVEL CONVERTING DEVICE EMPLOYING AREA RECOGNIZING DEVICE.

BACKGROUND OF THE INVENTION

1. Field of the Invention

The present invention relates to an area recognizing device for recognizing an edge area and a non-edge area of an image which is expressed by an N-level gradation level, and to a gradation level converting device employing the area recognizing device (N<M).

2. Description of the Related Art

Recently, outputting devices, such as a printing device and a display device, print and display multi-level data. When image information is processed electronically, an information amount is inevitably increased.

In order to tackle the problem of increased information amount, a facsimile apparatus, a still image file, and a copy device convert an original image into binary signals, then transmit, store, and process the binary signals. However, image quality is degraded if the binary signals are directly reproduced with the outputting devices.

To improve image quality, the binary signals are returned into multi-level gradation signals in reproducing with the outputting devices. Consequently, the degradation of image quality is avoided.

A dither method and an error-diffusion method are employed to express the intensity of color by binary signals, and the binary signals of this digital halftone image are returned into multi-level signals by a known halftone image estimating method. For example, "METHOD AND APPARATUS FOR ESTIMATING HALFTONE IMAGE FROM BINARY IMAGE" cited in U.S. Pat. No. 4,758,897 is a well known method. With this method, a halftone image is estimated based on a ratio of black and white pixels within a scanning aperture to be scanned. More specifically, a larger scanning aperture is selected in an area where the fluctuation in pixel level is small, while a smaller scanning aperture is selected in an area where the fluctuation in pixel level is large. Then, a halftone image is estimated based on a ratio of black and white pixels within the thus selected scanning aperture.

Also, the binary signals are converted into the multi-level signals as eliminating any influence of patterns of the original image being different depending on cycles by detecting edges with a plurality of differentiators, and selecting the detected edge signal (for example, Japanese Laid-Open Patent Application No. 3-250975).

Also, edges of the binary-level image are detected by a single edge-detection filter, then an edge area, a non-edge area, and an intermediate area are recognized based on outputs from the edge-detection filter. The degree of smoothness of the image is adjusted by changing weighing coefficients to be added within the scanning aperture (for example, Japanese Laid-Open Patent Application No.4-51378).

However, desired uniformity and resolution are not obtained simultaneously by simply controlling the aperture size and weighing coefficients of a filter which estimates a halftone image based on a ratio of black and white pixels within the scanning aperture of the binary image.

Also, to implement the method of detecting edges of the binary image with a plurality of edge filters, and selecting a single edge filter based on the detected result, the process of switching between an edge area and a non-edge is needed. Consequently, negative effects of detection errors appear in a display image. With a single edge detector, on the other hand, the detection is influenced by the texture of a dot arrangement pattern in converting into the binary signals; as a result, recognition errors frequently occur.

SUMMARY OF THE INVENTION

It is a first object of the present invention to provide a gradation level converting device for converting a gradation level optimally both in an edge and a non-edge area of an image as maintaining desired uniformity and resolution simultaneously so that desired image quality is obtained.

It is a second object of the present invention to provide an area recognizing device for recognizing an edge area and a non-edge area of an image before gradation level conversion so that the gradation level conversion can be performed rationally.

It is a third object of the present invention to provide a device which is suitable for a system which converts a high-level gradation image into a low-level gradation image for the purpose of storing, then returns the low-level gradation image into the high-level gradation image to be outputted, the device further being capable of reproducing the high-level gradation image with high reproductivity.

The first object may be fulfilled by a gradation level converting device for converting an image which is expressed by an N gradation level into an image which is expressed by an M gradation level (N<M), the gradation level converting device comprising a first smoothing filter which comprises a scanning aperture which includes a pixel in concern and pixels which are located around the pixel in concern of the N-level gradation image and converts the N-level gradation image into the M-level gradation image by multiplying each of the pixels within the scanning aperture by a certain weighing coefficient and adding the multiplied pixels, a second smoothing filter possessing the degree of smoothness which is greater than the first smoothing filter since an aperture size and a weighing coefficient are different from the first smoothing filter, and converting each of the pixels from the N gradation level into the M gradation level according to the degree of smoothness, an edge detecting unit for detecting an edge component of the pixel in concern according to each of the first smoothing filter and the second smoothing filter, a mixing ratio calculating unit for calculating a mixing ratio from the detected result of the edge detecting unit, a mixing unit for mixing the converted result outputted from the first smoothing filter and -the converted result outputted from the second smoothing filter based on the calculated mixing ratio, an area recognizing unit for recognizing the edge area and the non-edge area of the N-level gradation image, and a selecting unit for selecting the mixed result outputted from the mixing unit for the non-edge area of the N-level gradation image and selecting the converted result from the first smoothing filter for the edge area as referring to the recognized result from the area recognizing unit.

The area recognizing unit may comprise a plurality of filters each of which detects an edge component of a pixel in concern as referring to a value of a pixel within an area including the pixel in concern, the filters possessing an identical edge detection characteristic and the pixel concern in each of the filters being set at a different location in the N-level gradation image, an adding unit for comparing output from each of the plurality of filters with a certain value, and adding the output only when it is greater than the certain value, a judging unit for comparing the added result from the adding unit with a certain judgement level, and outputting the compared result as a judgement, and a recognizing unit for recognizing a part of the image at which each of the filters is located as the edge area when the judgement outputted from the judging unit is a first judgement, and recognizing it as the non-edge area when the judgement is a second judgement level.

The gradation level converting device may further comprise a setting unit for setting a plurality of processing modes, or an image quality adjustment value, and a first controlling unit for controlling the certain judgement level according to a setting by the setting unit.

The area recognizing unit may comprise a plurality of first filters each of which detects an edge component of a pixel in concern as referring to a value of a pixel within an area including the pixel in concern, the filters possessing an identical edge detection characteristic and the pixel in concern in each of the filters being set at a different location in the N-level gradation image, a plurality of second filters which possess an identical edge detection characteristic which is different from the plurality of first filters, and the pixel in concern in each of the filters is set at a different location in the N-level gradation image, a first adding unit for adding the detected result outputted from each of the plurality of first filters, a second adding unit for adding output from each of the plurality of second filters, a first judging unit for comparing the added result outputted from the first adding unit with a first judgement level, and outputting the compared result as a judgement, a second judging unit for comparing the added result from the second adding unit with a second judgement level, and outputting the compared result as a judgement, and an area recognizing unit for recognizing whether a part of the image where the filter is located is the edge area or the non-edge area according to the judgements from the first judging unit and the second judging unit.

The gradation level converting device may further comprise a setting unit for setting a plurality of processing units, or an image quality adjustment value, and a second control unit for controlling validity of the judgement from one of the first judging unit and the second judging unit according to a setting by the setting unit.

The first object may also be fulfilled by a gradation level converting device for converting an image which is expressed by an N gradation level into an image which is expressed by an M gradation level (N<M), the gradation level converting device comprising a first smoothing filter which comprises a scanning aperture which includes a pixel in concern and pixels which are located around the pixel in concern of the N-level gradation image and converts the N-level gradation image into the M-level gradation image by multiplying each of the pixels within the scanning aperture by a certain weighing coefficient and adding the multiplied pixels, a second smoothing filter possessing the degree of smoothness which is greater than the first smoothing filter since an aperture size and a weighing coefficient are different from the first smoothing filter, and converting each of the pixels from the N gradation level into the M gradation level according to the degree of smoothness, an edge detecting unit for detecting an edge component of the pixel in concern according to each of the first smoothing filter and the second smoothing filter, a mixing ratio calculating unit for calculating a mixing ratio from the detected result of the edge detecting unit, a mixing unit for mixing the converted result outputted from the first smoothing filter and the converted result outputted from the second smoothing filter based on the calculated mixing ratio, an enhancing unit for enhancing the M-level gradation image outputted from the first smoothing filter, and outputting the enhanced image, an area recognizing unit for recognizing the edge area and the non-edge area of the N-level gradation image, and a selecting unit for selecting the mixed result outputted from the mixing unit for the non-edge area of the N-level gradation image and selecting the converted result from the enhancing unit for the edge area as referring to the recognized result from the area recognizing unit.

The first object may be fulfilled by a device for converting input image data which is expressed by an N gradation level into image data which is expressed by an M gradation level (N<M), the device comprising a plurality of edge detecting units with different characteristics each for detecting an edge amount of the N-level gradation image data, an extracting unit for mixing the detected results outputted from each of the plurality of edge detecting unit to generate an edge extraction amount, a plurality of spatial filters for smoothing the N-level gradation image with different weighing coefficients or smoothing different smoothing areas of the N-level gradation image data, a mixing unit for normalizing the smoothed result outputted from each of the plurality of spatial filters, and mixing the normalized result with a certain mixing ratio according to the edge extraction amount outputted from the extracting unit, and an outputting unit for defining the mixed result outputted from the mixing unit in the M gradation level, and outputting the defined result.

The extracting unit may calculate the mixing ratio from the detected edge amounts from the plurality of edge detecting units, and may generate the edge extraction amount by mixing the edge amounts based on the calculated mixing ratio.

Each of the plurality of spatial filters may have an adding unit for adding a pixel in concern and pixels which are located around the pixel in concern of the N-level image based on the weighing coefficient or the size of the smoothing area.

The mixing unit may have a normalizing unit for normalizing the outputs according to a sum of the weighing coefficients and the gradation level N.

The second object may be fulfilled by an area recognizing device for recognizing an edge area and a non-edge area of an image which is expressed by an N gradation level, the area recognizing device comprising a plurality of filters each of which detects an edge component of a pixel in concern as referring to a value of a pixel within an area including the pixel in concern, the filters possessing an identical edge detection characteristic and the pixel concern in each of the filters being set at a different location in the N-level gradation image, an adding unit for comparing output from each of the plurality of filters with a certain value, and adding the output only when it is greater than the certain value, a judging unit for comparing the added result from the adding unit with a certain judgement level, and outputs the compared result as a judgement, and a recognizing unit for recognizing a part of the image at which each of the filters is located as the edge area when the judgement outputted from the judging unit is a first judgement, and recognizing it as the non-edge area when the judgement is a second judgement level.

The area recognizing device may further comprise a setting unit for setting a plurality of processing modes, or an image quality adjustment value, and a first controlling unit for controlling the certain judgement level according to a setting by the setting unit.

The second object may also be fulfilled by an area recognizing device for recognizing an edge area and a non-edge area of an image which is expressed by an N gradation level, the area recognizing device comprising a plurality of first filters each of which detects an edge component of a pixel in concern as referring to a value of a pixel within an area including the pixel in concern, the filters possessing an identical edge detection characteristic and the pixel concern in each of the filters being set at a different location in the N-level gradation image, a plurality of second filters which possess an identical edge detection characteristic which is different from the plurality of first filters, and the pixel in concern in each of the filters is set at a different location in the N-level gradation image, a first adding unit for adding the detected result outputted from each of the plurality of first filters, a second adding unit for adding output from each of the plurality of second filters, a first judging unit for comparing the added result outputted from the first adding unit with a first judgement level, and outputs the compared result as a judgement, a second judging unit for comparing the added result from the second adding unit with a second judgement level, and outputs the compared result as a judgement, and an area recognizing unit for recognizing whether a part of the image where the filter is located is the edge area or the non-edge area according to the judgements from the first judging unit and the second judging unit.

The first adding unit may compare each of the outputs from the plurality of first filters with a first level, and obtain its output by adding the output which is greater than the first level, and the second adding unit may compare each of the outputs from the plurality of second filters with a second level, and obtain its output by adding the output which is greater than the second level.

The area recognizing device may further comprise a setting unit for setting a plurality of processing modes, or an image quality adjustment value, and a second control unit for controlling validity of the judgement from one of the first judging unit and the second judging unit according to a setting by the setting unit.

The third object may be fulfilled by a gradation level converting device for converting an image which is expressed by a K gradation level into an image which is expressed by an N gradation level, then converting the N-level gradation image into an image which is expressed by an M gradation level, N being smaller than K and M being larger than N, the gradation level converting device comprising a first converting unit for converting the K-level gradation image data so that a value of each pixel of the K-level gradation image data is centered around a median of a signal range of the K-level gradation image data, an N-level converting unit for converting the K-level gradation image data converted by the first converting unit into the N-level gradation image data, an estimating unit for estimating the M-level gradation image data from the N-level gradation image data generated by the N-level converting unit, and a second converting unit which operates oppositely to the first converting means to convert the M-level gradation image estimated by the estimating unit.

The first converting unit may perform a non-linear conversion which minimizes a fluctuation amount around the median of the signal range of the K-level gradation image data.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7(a) and FIG. 7(b) show a filter 1900 and a filter 1901 which are employed by the edge extracting circuit 19, respectively;

FIG. 8 is a circuit block diagram depicting a filter 1500;

FIG. 9 illustrates spatial frequency characteristics of the filters in the first embodiment;

FIG. 10(a) illustrates the filter 1500 which is employed by a first edge detecting circuit 15, and FIGS. 10(b) and 10(c) illustrate filters 1600 and 1601 which are employed by a second edge detecting circuit 16;

FIGS. 14(a), 14(b), and 14(c) show the operation of the data converting circuit 7;

FIG. 17(a) illustrates detection locations of an edge-detection filter 41 and an edge-detection filter 42; FIG. 17(b) illustrates filters 4100 and 4101 to be employed as the edge-detection filter 41; and FIGS. 17(c) and 17(b) illustrate filters 4200 and 4201 to be employed as the edge-detection filter 42;

FIG. 23(a) illustrates K-level image data; FIG. 23(b) illustrates binary data which is obtained by converting the K-level image data in FIG. 23(a); FIG. 23(c) illustrates output data of an estimation value NA which is obtained by estimating the binary data 100 in FIG. 23(b); FIG. 23(d) illustrates binary data which is obtained by converting the K-level image data in FIG. 23(a) by a conversion curve 1, then performing binary conversion on it; FIG. 23(e) illustrates output data of the estimation value NA which is obtained by estimating the binary data 100 in FIG. 23(d); and FIG. 23(f) illustrates output data which is obtained by returning the estimation value NA into the original level by a conversion curve 2;

DESCRIPTION OF PREFERRED EMBODIMENTS

Embodiment 1

Figure 1:
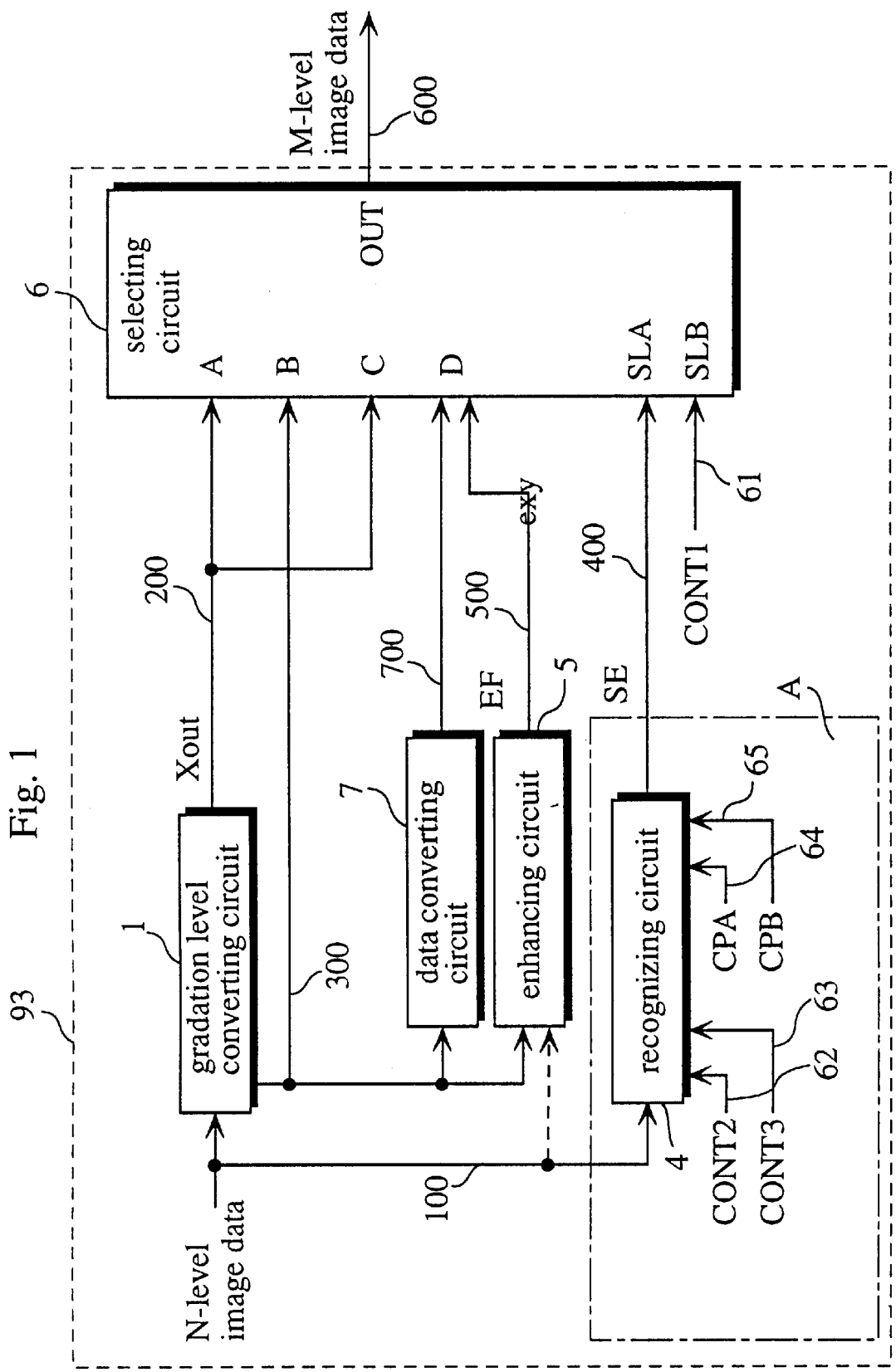
FIG. 1 is a block diagram depicting a gradation level converting device which comprises an area recognizing device in a first embodiment of the present invention.

An area recognizing device and a gradation level converting device relating to a first embodiment of the present invention are described as referring to the drawings.

FIG. 1 is a block diagram depicting the gradation level converting device which comprises an area recognizing device A in the first embodiment.

In FIG. 1, a gradation level converting circuit 1 converts N-level gradation image data 100 into M-level gradation image data 200 (N<M).

An enhancing circuit 5 enhances the N-level gradation image data 100 or an estimation value NA (signal 300) from the gradation level converting circuit 1 to generate an enhancement signal EF (signal 500).

A data converting circuit 7 inputs the estimation value NA (signal 300) from the gradation level converting circuit 1, implements data conversion pixel by pixel, and outputs a signal 700. This data conversion enhances sharpness of the estimation value NA (signal 300).1

A recognizing circuit 4 of the area recognizing device A outputs a recognition signal 400 (signal SE) for recognizing an edge area and a non-edge area of the N-level gradation image. The edge denotes a portion of the N-level gradation image where a large difference of density exits, and the non-edge denotes a portion of the N-level gradation image where neither a large nor any difference of density exists. For example, in the N-level gradation image being a portrait, the edge includes a border between the background and a person and a border between hair and the forehead of the person, while the non-edge includes a center part of the forehead.

A selecting circuit 6 selects inputs A–D by the recognition signal 400 and a control signal 61 (CONT 1), and outputs a selection signal 600. Accordingly, either of a signal 200 (Xout), the signal 300 (estimation value NA), the signal 500 (EF), and the signal 700 is outputted as the selection signal 600.

The configuration of each of the circuits is described in detail.

Figure 2:
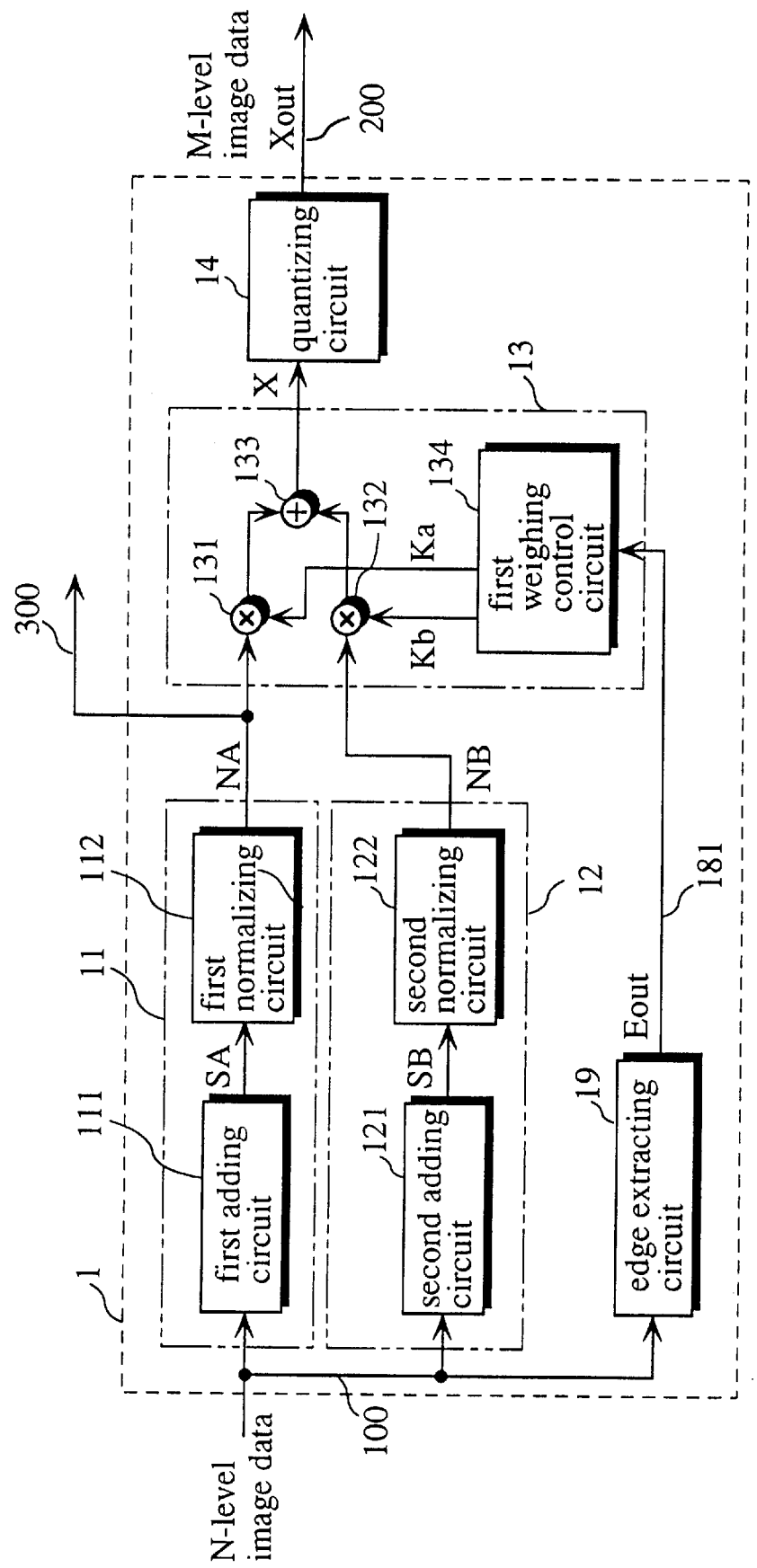
FIG. 2 is a block diagram depicting the gradation level converting circuit 1 in FIG. 1.

FIG. 2 is a block diagram depicting the gradation level converting circuit 1. The gradation level converting circuit 1 for scanning the N-level gradation image pixel by pixel, and converting the N-level gradation image into the M-level gradation image (N<M) comprises two multi-level converting circuits 11 and 12, an edge extracting circuit 19, a mixing circuit 13, and a quantizing circuit 14. Each of the multi-level converting circuits 11 and 12 comprises adding circuits 111 and 121, and normalizing circuits 112 and 122 (hereunder, to distinguish between the circuit 11 and the circuit 12, the circuits 111 and 112 composing the circuit 11 are referred to first circuits while the circuits 121 and 122 composing the circuit 12 are referred to second circuits).

Each of the first and the second adding circuits 111 and 121 has a filter with a preset scanning aperture size. The first and the second adding circuits 111 and 121 apply the filters to the inputted N-level gradation image data in a range which is centered around a pixel in concern, and adds each of the pixels obtained through the scanning aperture according to weighing coefficients set for each of the pixels.

Figure 3A:
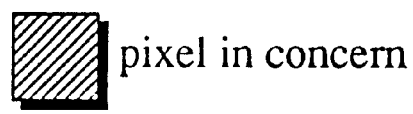
FIG. 3(a) shows a filter (1110) which is employed by a first adding circuit 111.
Figure 3B:
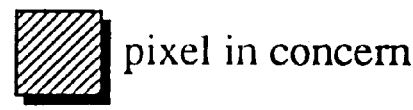
FIG. 3(b) shows a filter (1210) which is employed by a second adding circuit 121.

FIG. 3(a) shows a filter 1110 of the first adding circuit 111, and FIG. 3(b) shows a filter 1210 of the second adding circuit 121. A numeral within a window corresponding to each pixel of the filters 1110 and 1210 denotes a weighing coefficient. As shown in FIGS. 3(a) and 3(b), the scanning aperture size of the filter 1110 is 3×3 pixels, which is smaller than the scanning aperture size of the filter 1210 which is 5×5 pixels. Accordingly, the first adding circuit 111 with the filter 1110 provides a priority to resolution in the conversion processing, and the second adding circuit 121 with the filter 1210 provides a priority to gradation in the conversion processing.

Figure 4:
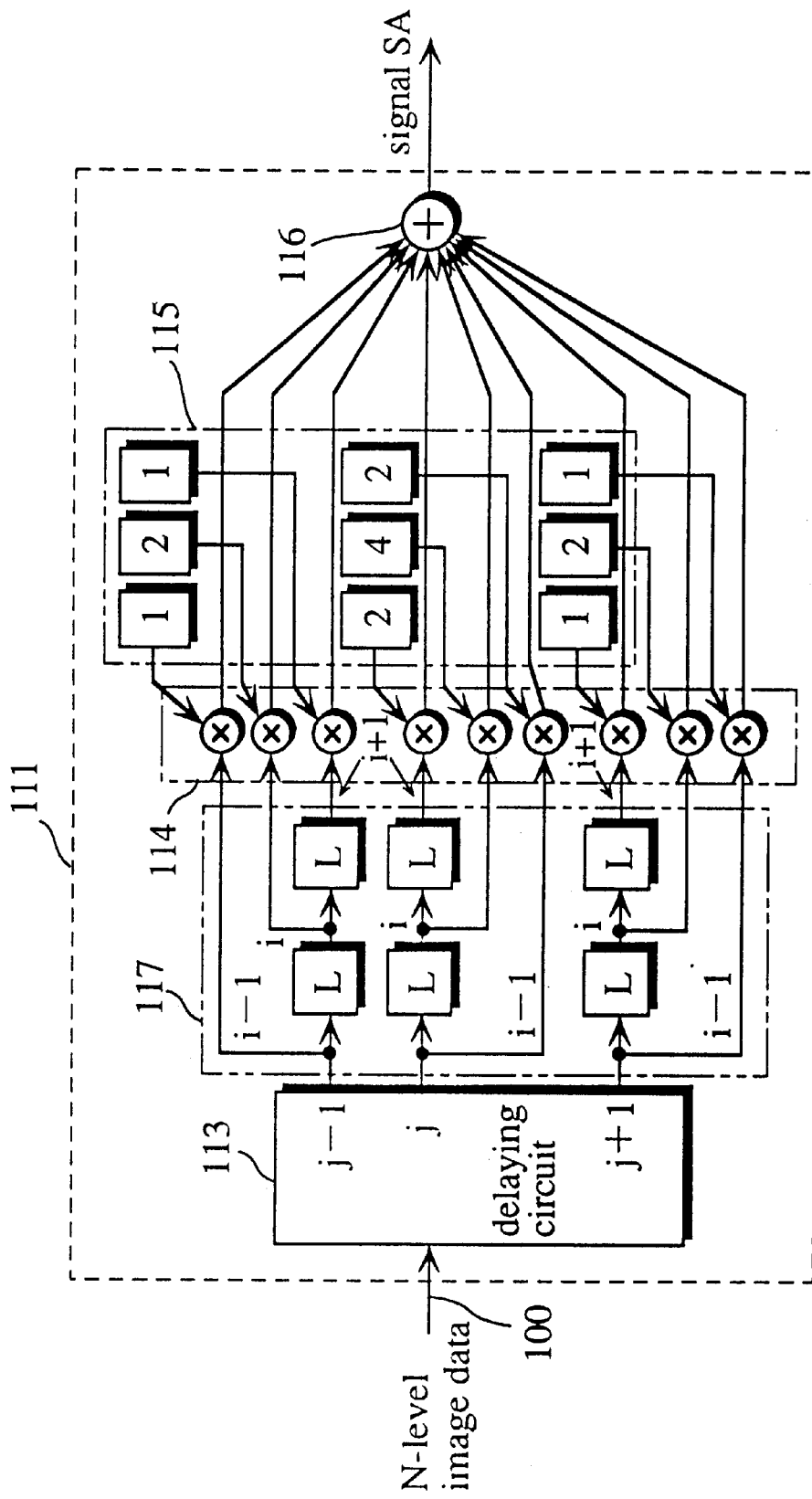
FIG. 4 is a block diagram depicting the first adding circuit 111.

FIG. 4 shows the configuration of the first adding circuit 111. In FIG. 4, a delaying circuit 113 outputs three lines of data including j−1, j, and j+1 from the inputted N-level gradation image data pixel by pixel. For example, the delaying circuit 113 comprises three line memories. A latch circuit 117 delays a pixel signal by the time take to scan one pixel; numeral 116 denotes an adder; and a multiplier 114 multiplies input data by an integer within a frame 115.

When a pixel P(i, j) is in concern, the output from the first adding circuit 111 in FIG. 4 is shown in the following expression (1):

$$SA = 1 \cdot P(i-1, j-1) + 2 \cdot P(i, j-1) + 2 \cdot P(i+1, j-1) + 2 \cdot P(i-1, j) +$$

$$4 \cdot P(i, j) + 2 \cdot P(i+1, j) + 1 \cdot P(i-1, j+1) + 2 \cdot P(i, j+1) + 1 \cdot P(i+1, j+1) \quad (1)$$

Figure 5A:
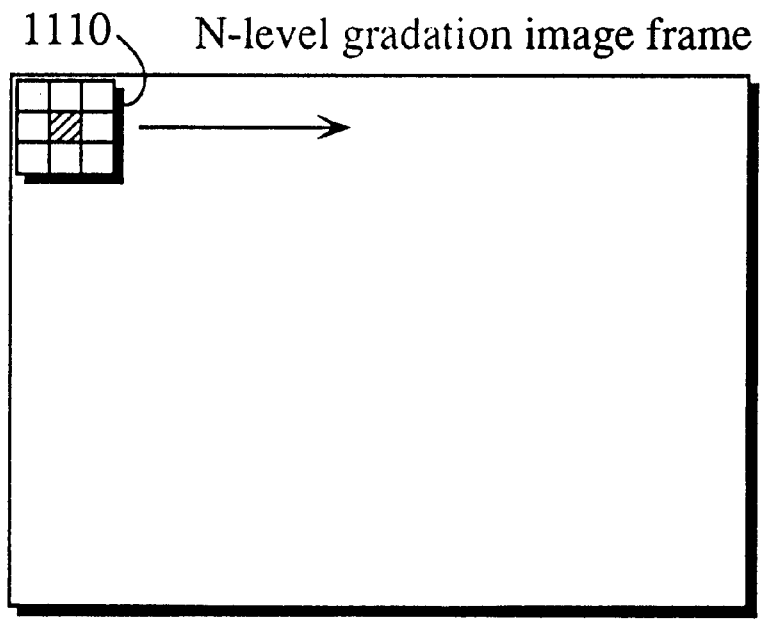
FIG. 5(a) illustrates scanning of an image frame with the filter 1110.
Figure 5B:
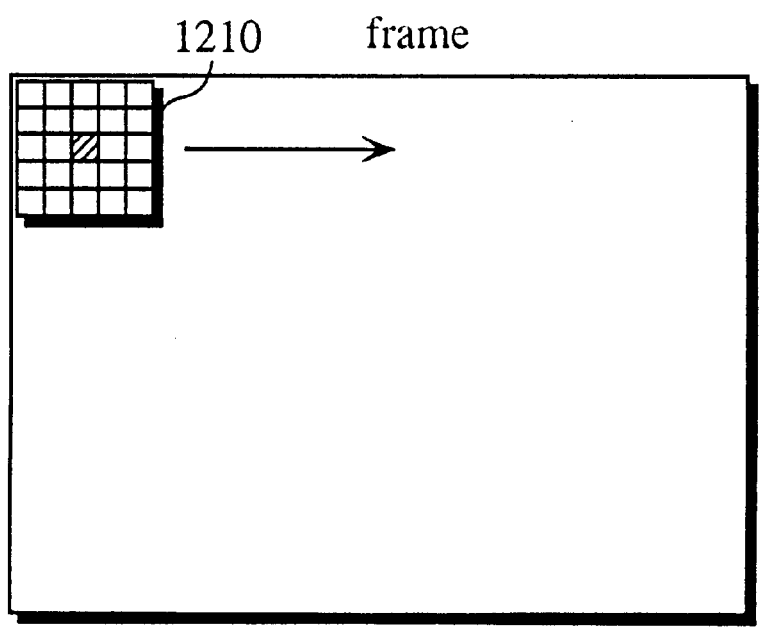
FIG. 5(b) illustrates scanning of an image frame with the filter 1210.

As shown in FIG. 5(a), the delaying circuit 113 generates one output when the pixel in concern and the filter 1110 are shifted by one pixel in a scanning direction from the upper left hand corner of a frame of the N-level gradation image data. Accordingly, the output SA which is set forth above is obtained upon each shifting of the pixel in concern by one pixel. Although not illustrated, the configuration of the second adding circuit 121 is substantially the same as the configuration of the first adding circuit 111 in FIG. 4 except that the number of the delay output lines, the number of the latch circuits, and numeral values by which the multiplier multiplies data are different. As shown in FIG. 5(b), the second adding circuit 121 outputs an output SB upon each shifting of the pixel in concern and the filter 1210 by one pixel in the scanning direction. The output SB from the second adding circuit 121 is shown in the following expression (2):

$$SB = P(i-2, j-2) + P(i-1, j-2) + P(i, j-2) + P(i+2, j-2) + \quad (2)$$

$$P(i-2, j-1) + P(i-1, j-1) + P(i, j-1) + P(i+1, j-1) +$$

$$P(i+2, j-1) + P(i-2, j) + P(i-1, j) + P(i, j) +$$

-continued $$P(i+1, j) + P(i+2, j) + P(i-2, j+1) + P(i-1, j+1) +$$
$$P(i, j+1) + P(i+1, j+1) + P(i+2, j+1) + P(i-2, j+2) +$$
$$P(i-1, j+2) + P(i, j+2) + P(i+1, j+2) + P(i+2, j+2)...$$

With the thus constructed first adding circuit 111 and the second adding circuit 121, when inputted image data is in the n-gradation level and the total of weighing coefficients within the area which is subjected to addition is Sn, a maximum number of output Mx is obtained by the following expression (3):

$$Mx=Sn\cdot(n-1) \qquad (3)$$

With the first adding circuit 111, when the total of weighing coefficients is Sa and a maximum value of the output SA is Ma, Ma=(n−1)·Sa. If n=2, since the first adding circuit 111 performs the addition based on the filter 1110 in FIG. 3(a), Sa=16 and Ma=16 are obtained from the weighing coefficients for the pixels.

Similarly, with the second adding circuit 121, when the total of weighing coefficients is Sb and a maximum value of the output SB is Mb, Mb=(n−1)·Sb. If n=2, since the second adding circuit 121 performs the addition based on the filter 1210 in FIG. 3(b), Sb=25 and Mb=25 are obtained from the weighing coefficients for the pixels.

Note that weighing coefficients provided to the filters for the first adding circuit 111 and the second adding circuit 121 may be negative values and zeros besides positive values. Further, they may be real numbers besides integers. When a coefficient "0" is assigned to a pixel, an input value is multiplied by "0", so that the multiplied result "0" is added. When the added result is negative, it is processed as "0" and a maximum value is obtained from the expression (3).

An area size (scanning aperture) where weighing coefficients are added is a certain value or size which is determined beforehand in the process of designing. The scanning area size is determined according to requested image quality of the N-level gradation image data and the M-level gradation image data. Stated otherwise, the area size is determined according to characteristics of a spatial filter. Therefore, the same area size may be applied although different area sizes are prepared in the configuration set forth above. However, when the same area size is employed, it is better to vary the degree of smoothness (smoothness of a spatial filter) by different weighing coefficients.

The first normalizing circuit 112 and the second normalizing circuit 122 are described.

The first normalizing circuit 112 and the second normalizing circuit 122 are well known circuits for converting the added results SA and SB from the adding circuits 111 and 121 into the M-level gradation image data with the estimation values NA, NB based on the gradation level N and the total of weighing coefficients (N<M). More specifically, when an input value is SGx and a maximum input value is Mx from the expression (3), the first normalizing circuit 112 and the second normalizing circuit 122 normalize the input values into M-level gradation image data SCx according to the following expression (4). [ ] represents emission of decimals in converting into integers.

$$SCx=[(SGx-Mx)\cdot(M-1)+0.5] \qquad (4)$$

The expression (4) may be implemented by an operation circuit; otherwise, it may be implemented by a look-up table (hereunder, referred to an LUT) where SGx and SCsx are defined from the expression (4) beforehand and the calculated results are set in the table.

According to the expression (3) and (4), the input SGx which is the added result is normalized into the M-level gradation image data. More specifically, the input SA is normalized into the estimation value NA by the first normalizing circuit 112 which operates the following expression (5), and the input SB is normalized into the estimation value NB by the second normalizing circuit 122 which operates the following expression (6). [ ] represents emission of decimals in converting into integers.

$$NA=[(SA-Ma)\cdot(M-1)+0.5] \qquad (5)$$

$$NB=[(SB-Mb)\cdot(M-1)+0.5] \qquad (6)$$

If Ma=16, Mb=25, and M=256 in the first embodiment, the output NA for the input SA and the output NB for the input SB are obtained, and each of the outputs NA and NB is outputted to the mixing circuit 13 as 256-level gradation image data.

It is apparent from the scanning aperture sizes of the filters 1110 and 1120 of the first adding circuit 111 and the second adding circuit 121, the signal NA outputted from the first normalizing circuit 112 is M-level gradation image data which is superior in resolution although its gradation is not prominent, while the signal NB outputted from the second normalizing circuit 122 is M-level gradation image data which is superior in gradation although its resolution is not prominent.

Figure 11:
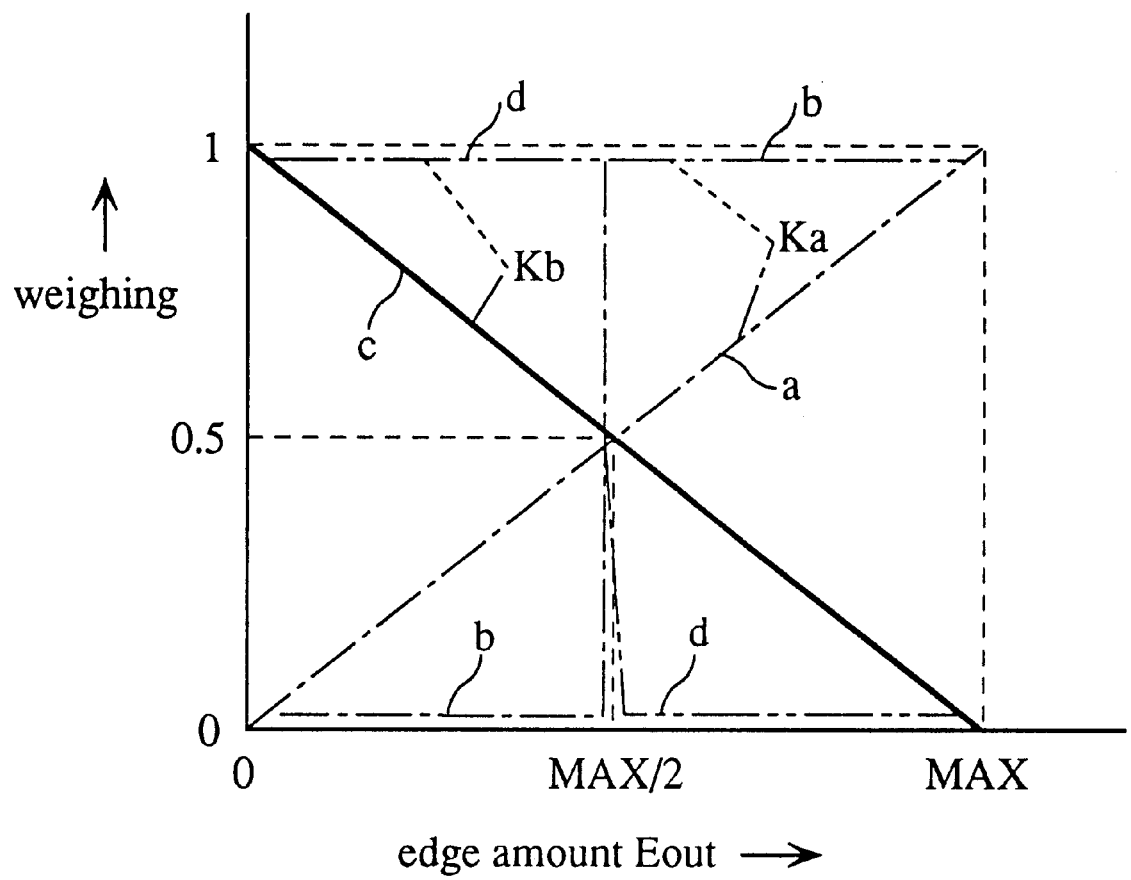
FIG. 11 shows the operation of a mixing circuit 13 in the first embodiment.

The mixing circuit 13 is explained as referring to FIGS. 2 and 11. FIG. 11 shows the operation of the mixing circuit 13.

The weighing mixing coefficients Ka and Kb represent weighing characteristics a and c shown in FIG. 11, and they are determined based on an signal Eout from the edge extracting circuit 19. The estimation value NA in FIG. 2 is multiplied by the coefficient Ka by the multiplier 131, and the estimation value NB is multiplied by the coefficient Kb by the multiplier 132. The multiplied results are added by the adder 133, and a mixing signal X is outputted.

When the estimation value NA (signal 300), the estimation value NB, and the edge amount Eout (signal 181) are inputted, the mixing circuit 13 generates the mixing signal X according to the following expression 7. MAX in the expression 7 represents a maximum value of the signal Eout (signal 181).

$$X=Ka\cdot NA+Kb\cdot NB, \text{ in which } Ka+Kb=1, Ka=Eout-\text{MAX} \qquad (7)$$

The mixing signal X obtained from the expression (7) is converted into an integer by the quantizing circuit 14, then it is finally converted into the M-level gradation image data. For example, when M=256, 256-level gradation image data Xout (signal 200) is generated.

Thus, the mixing circuit 13 puts weights to the plurality of input signals (the estimation values NA and NB) according to the edge amount Eout (signal 181), and performs the mixing processing to generate interpolated image data.

When the edge amount Eout is increased, the mixing circuit 13 increases a mixing ratio of the estimation value NA to the estimation value NB so that the former exceeds the latter. Accordingly, the degree of smoothness is decreased, and the same resolution is maintained. Oppositely, when the edge amount Eout is decreased, the mixing circuit 13 increases a mixing ratio of the estimation value NB to the estimation value NA so that the former exceeds the latter. Accordingly, the degree of smoothness is increased in the input image data. Consequently, the degree of smoothness is enhanced in an area where the degree of edge change is small, such as in a picture area.

As shown in FIG. 11, coefficients b and d which have binary change characteristics, MAX/2 may be utilized in the place of the coefficients a and c which have linear change characteristics as the coefficients Ka and Kb. Either the coefficients b and d, or a and c are selected, and this selection is desirable in processing a character. If the first weighing control circuit 134 comprises an LUT stored in either an RAM or an ROM, coefficients with indefinite change characteristics can be set as long as Ka+Kb=1.

Thus, with interpolation processing of the mixing circuit 13, outputs from a plurality of different adding circuits (spatial filters) can be changed continuously according to the edge amount Eout. As a result, the degree of smoothness is changed locally depending on an edge component of input image data, and the input image data can be converted into preset multi-level data. By performing multi-level conversion processing while maintaining edges appropriately, both desirable resolution in a character-line area and desirable smoothness in a picture area can be achieved simultaneously. Especially in an area including both a character and a picture, deterioration of image due to recognition errors can be suppressed by large since switching in binary processing is eliminated.

Although two inputs are mixed with the mixing circuit 13, the same effects can be obtained even if more than two inputs are mixed. Also, by increasing an area size which is subjected to addition (scanning aperture) or increasing the number of adding circuits with different weighing coefficients, gradation image data with more continuity can be generated.

Further, weights can be put to three or more inputs in parallel easily, so that the interpolation processing can be performed accurately. Although the linear weights are provided by the mixing circuit 13, non-linear weights are applicable.

The edge extracting circuit 19 is described as referring to FIGS. 7 and 9. FIG. 7 illustrates filters to be employed by the edge extracting circuit 19, and FIG. 9 shows spatial frequency characteristics of each of the filters in the first embodiment.

The edge extracting circuit 19 employs the linear differential filters 1900 and 1901 in FIG. 7. An edge component in a main scanning direction i and an edge component in a sub scanning direction j are detected with the filters 1901 and 1900, respectively. Therefore, edge components of the N-level image in the main scan direction i and in the sub scanning direction j can be extracted by combining an absolute value of the added result obtained by adding each of the coefficients of the filter 1900 to data and an absolute value of the added result obtained by adding each of the coefficients of the filter 1901 to data. As shown in FIG. 9, the filters 1900 and 1901 have spatial frequency characteristics whose peak is f0. With the thus featured filters, an edge component which is centered around a specific frequency is extracted from the N-level image. Then, the extracted edge component is clipped to a maximum value MAX, and is outputted to the mixing circuit 13 as the edge amount EOUT (signal 181).

Since different types of images are included herein, such as a pattern, a picture, and a character, it has been difficult to specify a spatial frequency of edge components conventionally. Edges which are centered around a specific frequency can be extracted only when image characteristics are defined or limited beforehand. In either of the cases, edge components in a desired edge area can be extracted.

Figure 6:
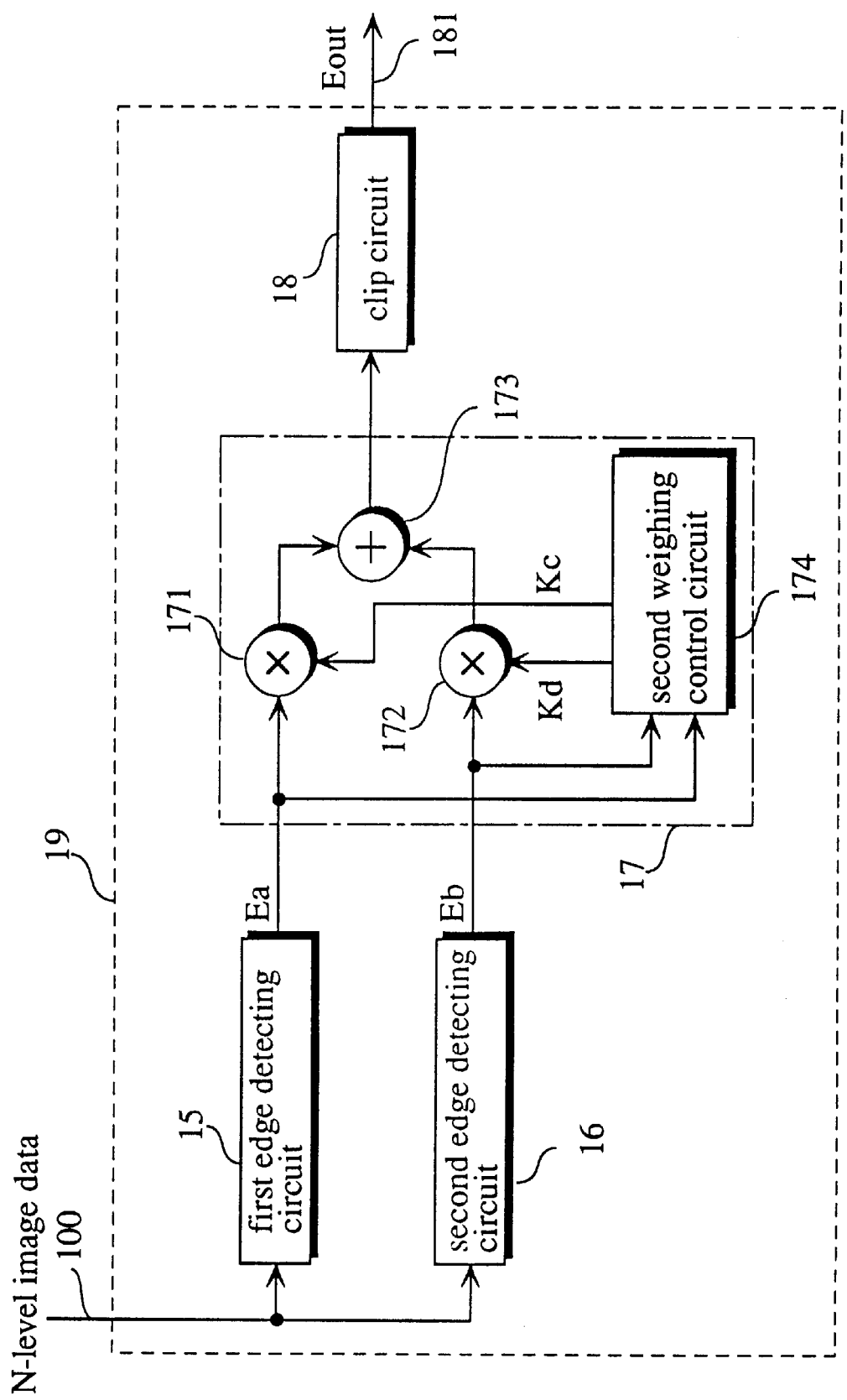
FIG. 6 is a block diagram depicting an improvement of an edge extracting circuit 19.

However, usually a plurality of pages including different images are processed by a FAX, a document file, a word processor, and a copy machine; also a pattern, a picture, and a character may be included in a single page. An edge extracting circuit which comprises a plurality of edge detectors with different spatial frequencies, such as that in FIG. 6, is needed to extract edge components of an edge area in each of the pattern area, the picture area, and the character area which are included in a single page.

An improvement of the edge extracting circuit 19 which can respond to edge components with different spatial frequencies is explained. FIG. 6 is a block diagram depicting the improved edge extracting circuit 19. The edge extracting circuit 19 in FIG. 6 comprises a first edge detecting circuit 15, a second edge detecting circuit 16, a mixing circuit 17, and a clip circuit 18.

The first edge detecting circuit 15 and the second edge detecting circuit 16 detect an edge component of the pixel in concern of the N-level gradation image.

The mixing circuit 17 mixes signal Ea and Eb representing the edge components from the first edge detecting circuit 15 and the second edge detecting circuit 16 with weighing coefficients Kc and Kd from a second weighing control circuit 174, and outputs an edge amount Eg. The edge component Ea from the first edge detecting circuit 15 is multiplied by the coefficient Kc with a multiplying circuit 171, and the edge component Eb from the second edge detecting circuit 16 is multiplied by the coefficient Kd with a multiplying circuit 172. The multiplied results are added by an adder 173, and the edge amount Eg is outputted. The mixing circuit 17 may be an LUT which is stored in an RAM or an ROM instead of being the operation circuit.

The coefficients Kc and Kd are obtained from the following expression (8).

$$Kc=Ea/(Ea+Eb+Cn), Kd=1-Kc \qquad (8)$$

The edge amount Eg is obtained from the following expression (9).

$$Eg=Kc\cdot Ea+Kd\cdot Eb \qquad (9).$$

A constant Cn is smaller than the edge components Ea and Eb so that required accuracy is obtained. For example, Cn=0.5.

The clip circuit 18 quantizes the edge amount Eg from the mixing circuit 17, clips a maximum value into MAX, and outputs the clipped edge amount Eout to the mixing circuit 13.

FIG. 10(a) shows a filter which is employed by the first edge detecting circuit 15, and FIGS. 10(b) and 10(c) show a filter which is employed by the second edge detecting circuit 16.

The edge component Ea is generated by a quadratic differential filter 1500 which is shown in FIG. 10(a), and an absolute value of the added result with the illustrated weighing coefficients is the edge amount Ea. The edge component Eb is generated by linear differential filters 1601 and 1602 shown in FIGS. 10(b) and 10(c), and the edge amount Eb is obtained by adding absolute values of each of the added results to which the illustrated weighing coefficients are added.

FIG. 8 is a circuit block diagram depicting the quadratic differential filter 1500. A delaying circuit 150 delays the N-level image data 100 in the sub scanning direction j by a line memory. The data which is delayed in the sub scanning direction j is further delayed in the main scanning direction i by a latch. Subsequently, the delayed data is added by an adding circuit 152, an adding circuit 153, an adding circuit 159, and an adding circuit 160 according to coefficients for a filter to be employed. A multiplier 154 multiplies output from the adding circuit 153 by four, and a multiplier 157 multiplies output from the adding circuit 159 by −1. An adder 155 outputs an edge component by adding outputs from the multiplier 157 and the multiplier 154. An absolute value calculating circuit 156 calculates an absolute value of the output from the adder 155, and outputs it as the edge component Ea. FIG. 8 shows a circuit implementing the quadratic differential filter. The circuit in FIG. 8 operates in responsive to coefficients of the quadratic differential filter by increasing and decreasing the latches and the line memories, the latches delaying in the main scanning direction i and the line memories delaying in the sub scanning direction j.

Although not illustrated, the configuration of the second edge detecting circuit 16 is basically the same as the first edge detecting circuit 15 which comprises the delaying circuit including six line memories, the latch circuit, the multiplier, the adder, the reversing device, and the absolute value calculating circuit.

As shown in FIG. 9, spatial frequency characteristics of the edge components Ea and Eb have different peak points f1 and f2 in which f1>f2. Apparently, the first edge detecting circuit 15 is suitable for detection of a fine edge component (short cycle) while the second edge detecting circuit 16 is suitable for detection of a coarse edge component (long cycle).

With these different edge components Ea and Eb, the mixing circuit 17 controls to increase a ratio for the bigger edge component according to the expressions (8) and (9) set forth above. Accordingly, compared to detection based on a specific frequency f0, edge components can be detected in a wider frequency range, so that edge components in edge areas under different circumstances, such as in an edge of a picture, in an edge of a character, and in an edge of graphics can be detected properly. Although the quadratic differential filter for generating the edge component Ea and the linear differential filters for generating the edge component Eb are employed in FIG. 10(a) and FIGS. 10(b) and 10(c), respectively, other detecting devices for detecting spatial frequencies can be employed. Further, the same effects are obtained by mixing outputs from more than three edge detecting devices.

Thus, by mixing edge components with different characteristics, switching in binary processing is eliminated, also edge components of an image can be extracted in a wide range of spatial frequencies. When the edge amount Eout is applied to the mixing circuit 13, the mixing can be performed with an aperture perfectly according to regional characteristics of edges. That is, even when images with different characteristics, such as a character, graphics, and a picture are included, switching in binary processing is eliminated from the estimation processing completely, and regional characteristics of edges can be responded automatically. Thus, edges can be extracted from each area optimally, and the estimation processing is performed according to the edges. Therefore, negative effects of recognition errors due to regions are suppressed, and deterioration of image quality is minimized. Further, the process of specifying an image is omitted. Accordingly, the time taken to specify an image is omitted, so that the entire processing can be completed at a high speed by the edge extracting circuit 19 in FIG. 6. Also, indefinite images such as images received by a FAX can be processed optimally.

The quantizing circuit 14 quantizes the mixing signal X to convert it into the M-level gradation image. Even if the estimation values NA and NB are converted into real numbers between 0 and 1, and they are mixed to generate a mixing signal which satisfies $0 \leq$ mixing signal $X \leq 1$, the quantizing circuit 14 re-quantizes the mixing signal into the required gradation level M by operating $[X \cdot (M-1)+0.5]$. If the quantizing circuit 14 is a memory where data can be replaced with another such as an RAM, the gradation level M which is required by a display device and a printing device can be generated by requantization appropriately. Also, when the estimation values NA and NB are converted into integer values which are between 0 and (M−1), and they are mixed to generate a mixing signal which satisfies $0 \leq$ mixing signal $X \leq (M-1)$, the quantizing circuit 14 operates $[X+0.5]$, and re-quantizes the mixing signal into the required gradation level M as setting a maximum value M−1.

The data converting circuit 7 is described as referring to FIGS. 12–14(a)–(c). The data converting circuit 7 enhances sharpness of the estimation value NA outputted from the first multi-level converting circuit 11 of the gradation level converting circuit 1.

Figure 12:
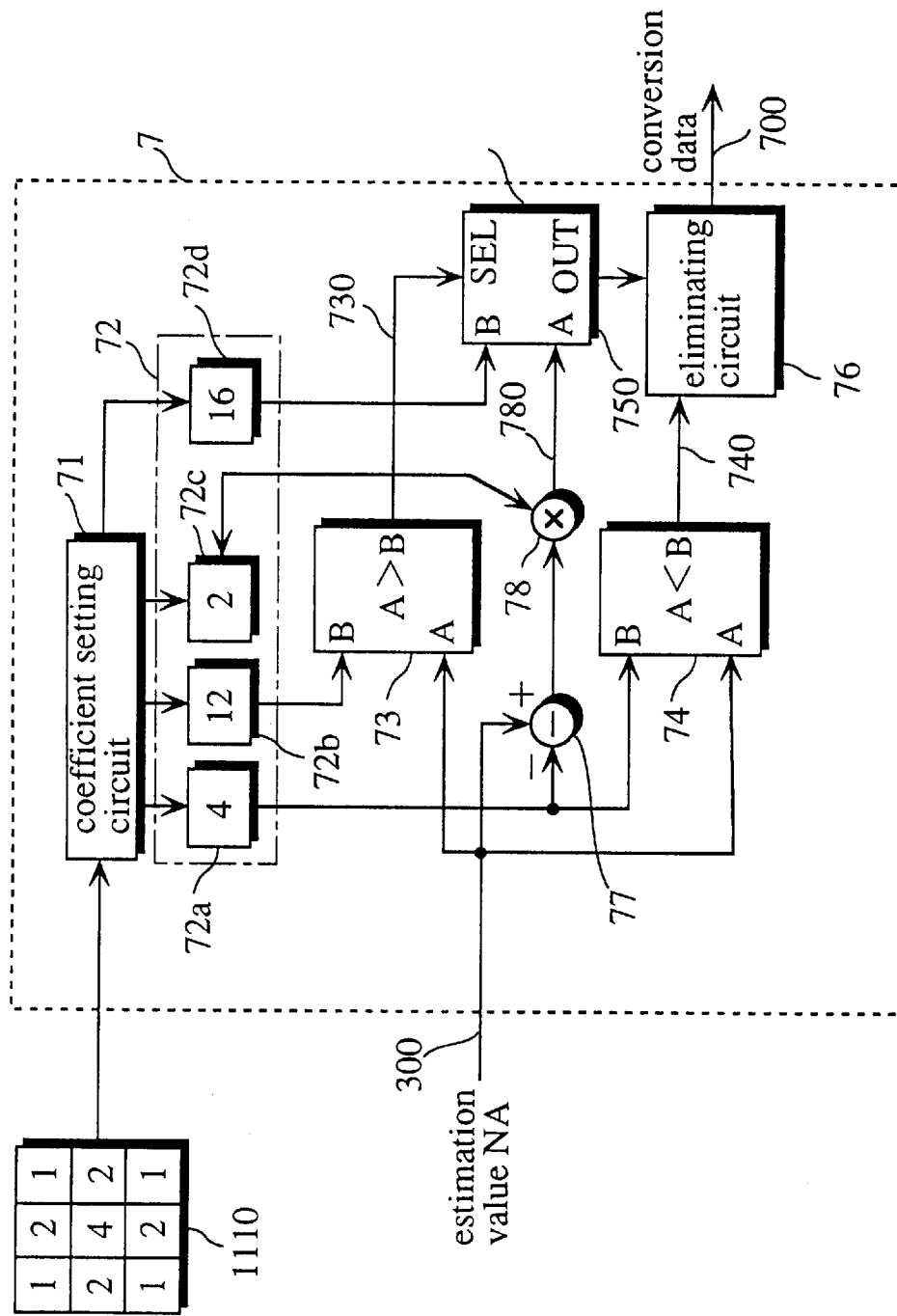
FIG. 12 is a block diagram depicting a data converting circuit 7.
Figure 13A:
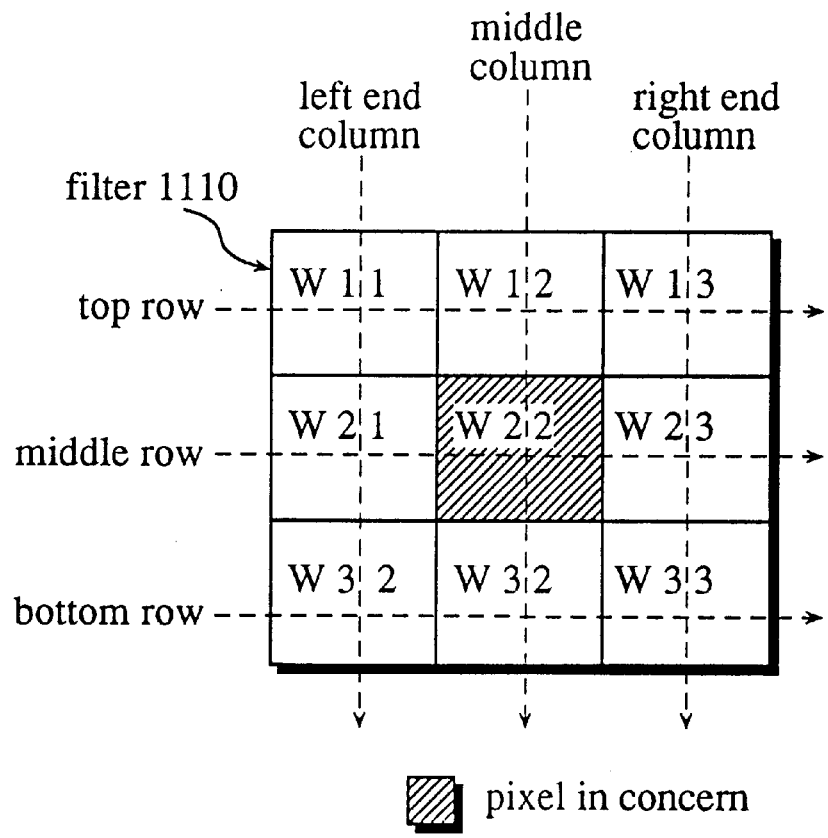
FIG. 13(a) shows a filter (1100) which explains setting of coefficients with the data converting circuit 7.
Figure 13B:
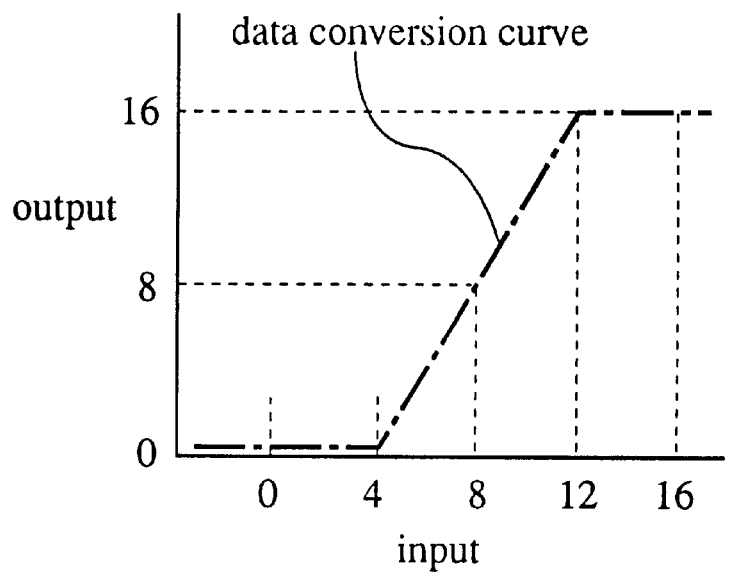
FIG. 13(b) shows a data conversion curve.

FIG. 12 is a block diagram depicting the data converting circuit 7; FIG. 13(a) shows a filter for setting a coefficient to the data converting circuit 7; FIG. 13(b) shows data conversion curves; and FIG. 14 shows the operation of the data converting circuit 7. It is assumed that N=2 and M=17 and a normalizing coefficient for the first normalizing circuit 112 is 1 (SA=NA).

In FIG. 12, the estimation value NA (signal 300) as an input is generated by the first multi-level converting circuit 11 in FIG. 2. The first adding circuit 111 of the first multi-level converting circuit 11 employs the filter 1110 shown in FIG. 3(a).

The coefficient setting circuit 71 of the data converting circuit 7 sets a data conversion coefficient to a coefficient register 72. The data conversion coefficient is calculated according to weighing coefficients of the filter 1110 which is employed by the first adding circuit 111 of the first multi-level converting circuit 11. The process of calculation is described later.

A value "4" stored in a register 72a is subtracted from the estimation value NA (signal 300) outputted from the first multi-level converting circuit 11 with a subtractor 77, and the subtracted result is multiplied by a value "2" stored in a register 72c with a multiplier 78. As a result, a signal 780 is obtained. A comparing circuit 73 converts an output signal 730 into "H" level when A>B for inputs, and converts it into "L" level when A≦B. A selecting circuit 75 selects a value "16" from a register 72d when the output signal 730 from the comparing circuit 73 is in "H" level, and selects the output signal 780 when the output signal 730 from the comparing circuit 73 is in "L" level, and outputs an output signal 750. A comparing circuit 74 converts an output signal 740 into "L" level when A<B for inputs, and converts it into "H" level when A≧B. An eliminating circuit 76 converts an output signal into "0" when the signal 740 is in "L" level, and outputs the output signal 750 as the output signal 700 when the signal 740 is in "H" level.

The process of calculating a value in each of the registers 72a–72d to be set to the coefficient setting register 72 is described.

FIG. 13a shows the filter 1110 as an embodiment. When weighing coefficients W11–W33 correspond to each of the pixel locations, "1" is set to W11, W13, W31, and W33; "2" is set to W12, W21, W23, and W32; and "4" is set to W22. Although weighing coefficients are not specified usually, better effects are obtained when a coefficient for the pixel in concern is larger than those for other pixels. If a coefficient is defined in the main scanning direction and the sub scanning direction, better image quality is obtained since it is not dependent on a direction any longer.

When register values reg(a), reg(b), reg(c), and reg(c) are stored in registers 72a, 72b, 72c, and 72d, each of the register values is calculated by the following expression 10.

$$\text{reg}(a) = W11 + W12 + W13$$

$$\text{reg}(d) = W11 + W12 + W13 + W21 + W22 + W23 + W31 + W32 + W33$$

$$\text{reg}(b) = \text{reg}(d) - \text{reg}(a)$$

$$\text{reg}(c) = \text{reg}(d) - (\text{reg}b) - \text{reg}(a)) \tag{10}$$

Although weighing coefficients located at the top row are added in calculating the reg(a), weighing coefficients located at one of the top row, the bottom row, the right end column and left end column may be added instead. The total of weighing coefficients is detected in calculating the reg(d).

In the expression (10), an estimation value which is obtained supposedly for pixels located at one end row or one end column is eliminated from the estimation value NA beforehand so that a scanning aperture is reduced equivalently in data conversion. Accordingly, the degree of sharpness is improved. Even when the scanning aperture size is enlarged, an estimation value for pixels located at one end row or one end column is eliminated from the estimation value, so that the same effects are obtained.

According to this data conversion, the inputted estimation value NA (signal 300) is converted by a data conversion curve in FIG. 13(b), and the converted result is outputted as the output signal 700.

FIGS. 14(a)–14(c) compare the estimation value NA (300) obtained when binary image data is shifted in the main scanning direction i by the filter 1110 in FIG. 13(a) with the signal 700 obtained by processing the estimation value NA by the data converting circuit 7. Apparently, the degree of sharpness (resolution) is enhanced.

By applying this conversion signal 700 to an input D of the selecting circuit 6, the degree of sharpness (resolution) in an edge area recognized by the recognizing circuit 4 can be enhanced. Also, since any recognition error in a non-edge area does not cause a radical density change, deterioration of image quality can be suppressed by large.

If each of the values (72a–72d) to be set to the register 72 of the data converting circuit 7 is specified, the data converting circuit 7 may be replaced with an ROM. In this case, a data conversion table which corresponds to data conversion coefficients is stored internally, and the same data conversion is performed. On the other hand, if each of the values (72a–72d) to be set to the register 72 of the data converting circuit 7 is not specified, the data converting circuit 7 may be replaced with an RAM. In this case, a coefficient corresponding to a weighing coefficient of the filter 1110 is calculated; a conversion table corresponding to a conversion curve is regenerated; and the re-generated conversion table is set to the RAM again.

Figure 15:
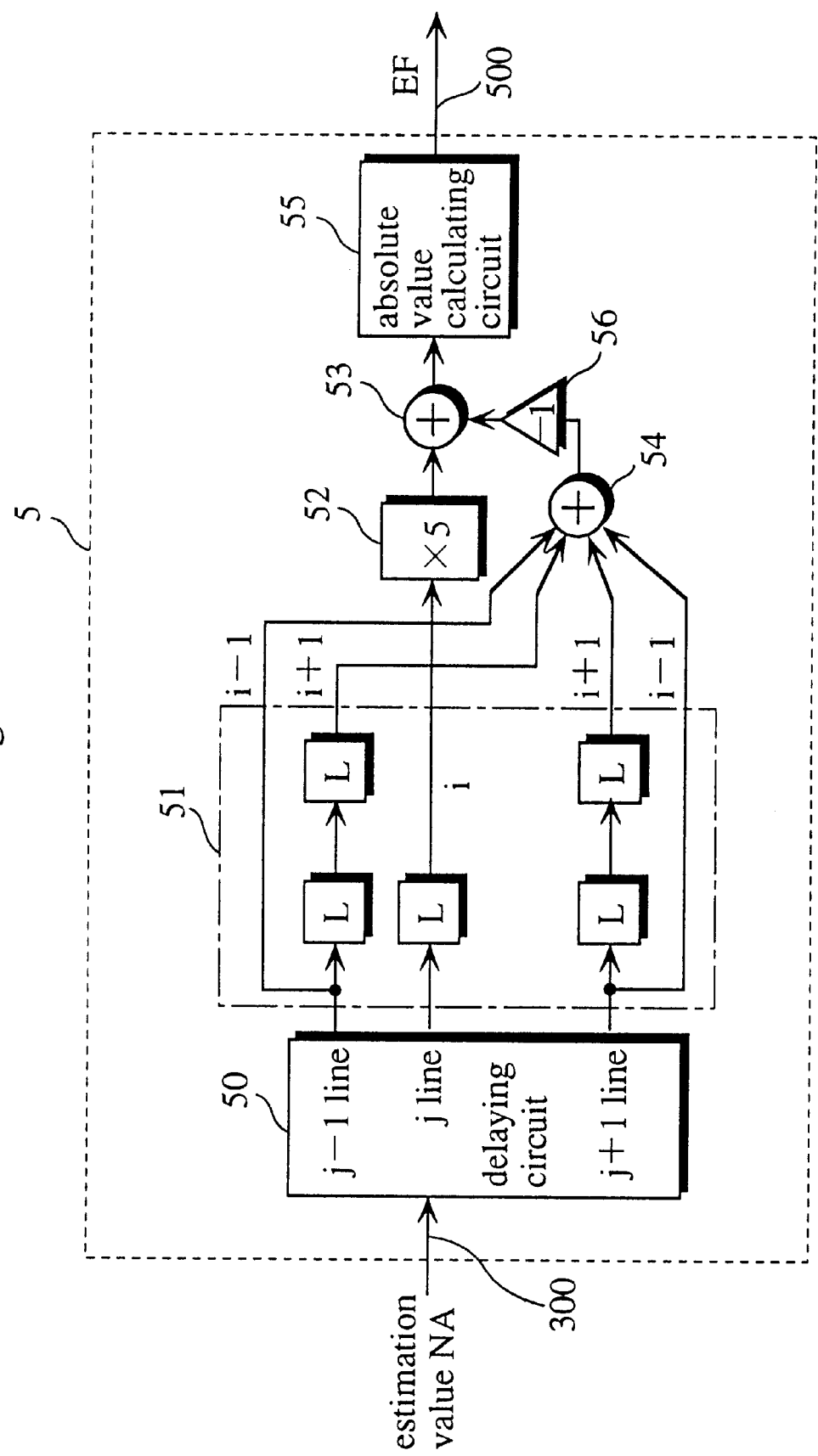
FIG. 15 is a block diagram depicting an enhancing circuit 5.

The enhancing circuit 5 is described as referring to FIG. 15.

In FIG. 15, the delaying circuit 50 comprises three line memories, and delays the estimation value NA (signal 300) in the sub scanning direction j. The delayed data is further delayed in the main scanning direction i by the delaying circuit 51. The delaying circuit 51 comprises a latch. A multiplying circuit 52 multiplies a value P (i, j) for a pixel to be enhanced by five. An adding circuit 54 adds pixel values P(i−1, j−1), P(i+1, j−1), P (i−1, j+1), and P(i+1, j+1).

A multiplying circuit 56 multiplies output from the adding circuit 54 by −1. An adding circuit 53 adds outputs from the multiplying circuits 52 and 56. An absolute value calculating circuit 55 calculates an absolute value of output from the adding circuit 53, and outputs the enhancement signal EF (signal 500).

The enhancing circuit 5 enhances the pixel in concern of the image with the estimation value NA (signal 300). Accordingly, the image is enhanced pixel by pixel. When the pixel P(i, j) is enhanced, the enhancement signal EF is obtained from the following expression (11), in which an absolute value is calculated from ABS[ ].

$$EF = ABS[5 \cdot P(i,j) - P(i, j-1) - P(i+1, j-1) - P(i-1, j+1) - P(i+1, j+1)] \tag{11}$$

Note that the same enhancement signal EF (signal 500) can be generated without delaying the estimation value NA (signal 300) by the -three line memory. In this case, five locations including the pixel in concern (i, j), that is (i, j), (i−1, j−1), (i+1, j−1), (i−1, j+1), and (i+1, j+1) are supposed as estimation locations; the estimation value NA of each of these five locations is calculated by the first multi-level converting circuit 11 in FIG. 2; and the calculated estimation values for the five locations, NA(i, j), NA(i−1, j−1), NA(i+1, j−1), NA(i+1, j−1), NA(i−1, j+1), and NA(i+1, j+1) are substituted to the expression 11 as pixel values for the locations. Consequently, the enhancement signal EF (signal 500) can be obtained directly from the N-level gradation image 100.

By obtaining the enhancement signal EF directly from the N-level gradation image 100, memory capacity of the three line memory of the delaying circuit 50 is reduced by large. Since N=2, M=256 in the first embodiment, eight bits per one pixel are delayed by the signal 300 while one bit per one pixel is delayed in the N-level gradation image 100. If the number of delay lines corresponds to this ratio, memory capacity of the line memory is reduced into ⅛. When the enhancement signal EF is obtained directly from the N-level gradation image 100, the size of the first multi-level converting circuit 11 is enlarged by five times since five pixels are concerned simultaneously. However, by comparing the number of elements corresponding to the reduced memory capacity ⅛ with the number of elements corresponding to 5 times larger than the size of the first multi-level converting circuit 11, it is found that a smaller number of elements are obtained by gaining the enhancement signal EF (signal 500) directly from the N-level gradation image 100. This is advantageous to an LSI since it can be performed at a higher speed.

With the enhancing circuit 5 as set forth, an enhancement image with the estimation value NA is obtained where sharpness is enhanced. By applying the enhancement signal 500 (signal EF) to an edge area of the N-level gradation image, deterioration of edge sharpness can be suppressed. Also, by emphasizing only an edge area, the M-level gradation image can be obtained without deteriorating smoothness in a non-edge area. As a result, the M-level gradation image (N<M) where edges are maintained in an edge area and high degree of smoothness is maintained in a non-edge area can be obtained. Note that not the enhancing circuit 5 but the selecting circuit 6, which will be described later, applies the enhancement signal to an edge area of the N-level gradation image.

The operation of the recognizing circuit 4 of the area recognizing device A is described as referring to FIGS. 16–19.

Figure 16:
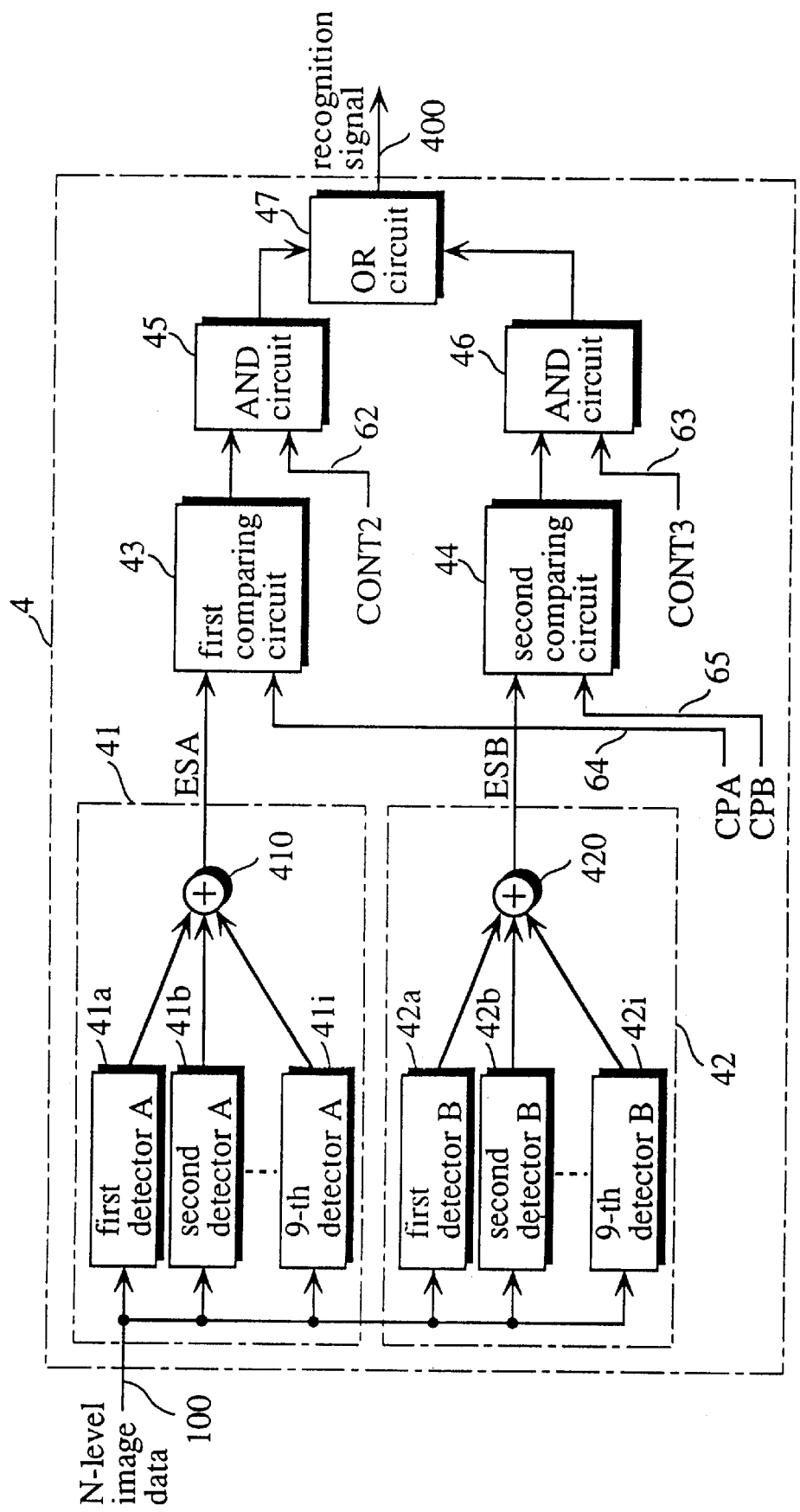
FIG. 16 is a block diagram depicting a recognizing circuit 4.

FIG. 16 is a block diagram depicting the recognizing circuit 4; FIG. 17(a) shows detection locations of an edge-detection filter 41 and an edge-detection filter 42; FIG. 17(b) illustrates the edge-detection filter 41; and FIGS. 17(c) and 17(d) illustrate the edge-detection filter 42. Although N and M are not specified, it is assumed that N=2 and M=256 in the following description.

In FIG. 16, the edge-detection filter 41 comprises nine detectors which are a first detector A(41a) through a 9-th detector A(41i), and an adder 410 for adding outputs from these nine detectors (41a–41i) to generate an addition signal ESA. As shown in FIG. 17(a), when the location of a pixel in concern to be processed by the gradation level converting circuit 1 is E, these nine detectors (41a–41i) detect an edge amount based on detection locations A–I which includes the location E. The same filters are used for the detectors 41a–41i. For example, edge components are extracted by the linear deferential filters 4100 and 4101 shown in FIG. 17(b), and an edge amount is calculated by adding an absolute value of each of the added results with weighing coefficients of the filters.

Figure 25:
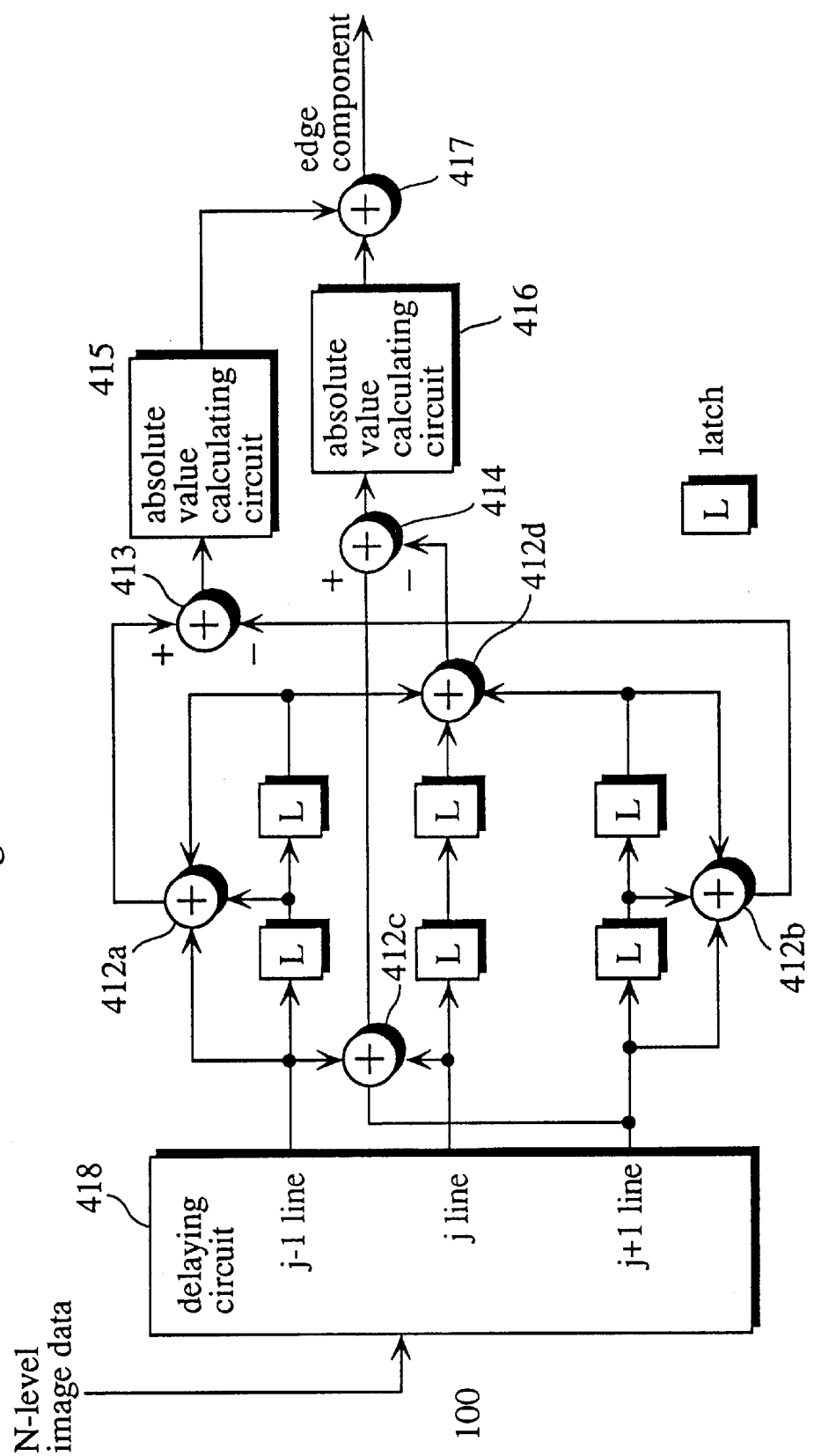
FIG. 25 is a circuit block diagram depicting an n-th detector A of the edge-detection filter 41.

FIG. 25 is a circuit block diagram implementing an n-th detector A (41a–41i) of the edge-detection filter 41. Herein, n is between 1 and 9. A delaying circuit 418 delays the N-level image data 100 in the sub scanning direction j by a line memory. The data delayed in the sub scanning direction j is further delayed in the main scanning direction i by a latch. Depending on a coefficient of a filter to be employed, addition is performed on the data by adding circuits 412a–412d. The adder 413 calculates a difference relating to the sub scanning direction j, and the absolute value calculating circuit 415 calculates an absolute value of the output from the adder 413. Accordingly, an edge component in the sub scanning direction (edge component relating to the filter 4101) is outputted. The adder 417 outputs an edge component of the pixel in concern by adding the edge component in the main scanning direction i and the edge component in the sub scanning direction j. FIG. 25 shows a circuit implementing a linear differential filter. The circuit in FIG. 25 responds to coefficients of a filter to be employed by increasing and decreasing the latches and the line memories, the latches delaying in the main scanning direction i and the line memories delaying in the sub scanning direction.

Similarly, the edge-detection filter 42 comprises nine detectors which are a first detector B(42a) through a 9-th detector B(42i), and an adder 420 for adding outputs from these nine detectors (42a–42i) to generate an addition signal ESB. As shown in FIG. 17(a), when the location of the pixel in concern to be processed by the gradation level converting circuit 1 is E, these nine detectors detect an edge amount based on detection locations A–I which include the location E. The same filters are used for the detectors 42a–42i. For example, edge components are extracted by the linear deferential filters 4200 and 4201 shown in FIG. 17(c), and an edge amount is calculated by adding an absolute value of each of the added results with the weighing coefficients of the filters.

As shown in FIG. 9, spatial frequency characteristics of the filters 4100 and 4101 have a peak frequency which is different from the filters 4200 and 4201.

When a peak frequency for the filters 4100 and 4101 is FSa and a peak frequency for the filters 4200 and 4201 is FSb, FSa>FSb. Therefore, the edge-detection filter 41 is suitable for detection of an edge with high frequencies, such as a edge in a character and a figure, and the edge-detection filter 42 is suitable for detection of an edge with low frequencies, such as an edge in a picture which is not influenced by a texture or a mesh-dot frequency which is determined from the mesh pitch.

The recognizing circuit 4 detects an edge amount by adding the detected results from a plurality of detectors, so that its output is increased when the detectors are closely related to each other. Accordingly, edges can be detected without any influence of a texture, such as a pattern which is unique to binary processing.

In FIG. 16, the first comparing circuit 43 compares the signal ESA with a comparison level CPA (signal 64), and outputs [H] when ESA>CPA while it outputs [L] when ESA≦CPA. Similarly, the second comparing circuit 44 compares the signal ESB with a comparison level CPB (signal 65), and outputs [H] when ESB>CPB while it outputs [L] when ESB≦CPB. [H] and [L] are judgement levels by which an edge area and a non-edge area are detected respectively.

An AND circuit 45 validates output from the first comparing circuit 43 when the control signal 62 (signal CONT 2) is in [H] level. On the other hand, the AND circuit 45 invalidates output from the first comparing circuit 43 when the control signal (signal CONT 2) is in [L] level, and maintains [L] level for every output. Similarly, an AND circuit 46 validates output from the second comparing circuit 44 when the control signal 63 (signal CONT 3) is in [H] level. On the other hand, the AND circuit 46 invalidates output from the second comparing circuit 44 when the control signal 63 is in [L] level, and maintains [L] level for every output.

An OR circuit 47 outputs the recognition signal 400 in [H] level when either of the outputs from the AND circuit 45 or the AND circuit 416 is in [H] level, and outputs the recognition signal 400 in [L] level when both of the outputs from the AND circuit 45 and the AND circuit 46 are in [L] level. [H] and [L] levels are judgment levels by which an edge area and a non-edge area are detected respectively.

Thus, the first comparing circuit 43 and the second comparing circuit 44 utilize the comparison levels CPA and CPB as parameters, and judges validity of the detection signals ESA and ESB which are obtained by adding edge signals from a plurality of detection locations.

As shown in FIG. 9, a recognition area "a" is detected by the comparison level CPA, and a recognition area "b" is detected by the comparison level CPB. Accordingly, frequency areas which are recognized by the parameters CPA and CPB can be controlled.

The control signal 62 controls validating and invalidating of the judged result from the first comparing circuit 43, while the control signal 63 controls validating and invalidating of the judged result from the second comparing circuit 44. Accordingly, a edge area can be detected in images with different optimal conditions, such as in a picture image, in a character image, in graphics, in a mesh-point image, and in a mixed image of character and picture appropriately, and detection characteristics can be controlled.

Figure 18:
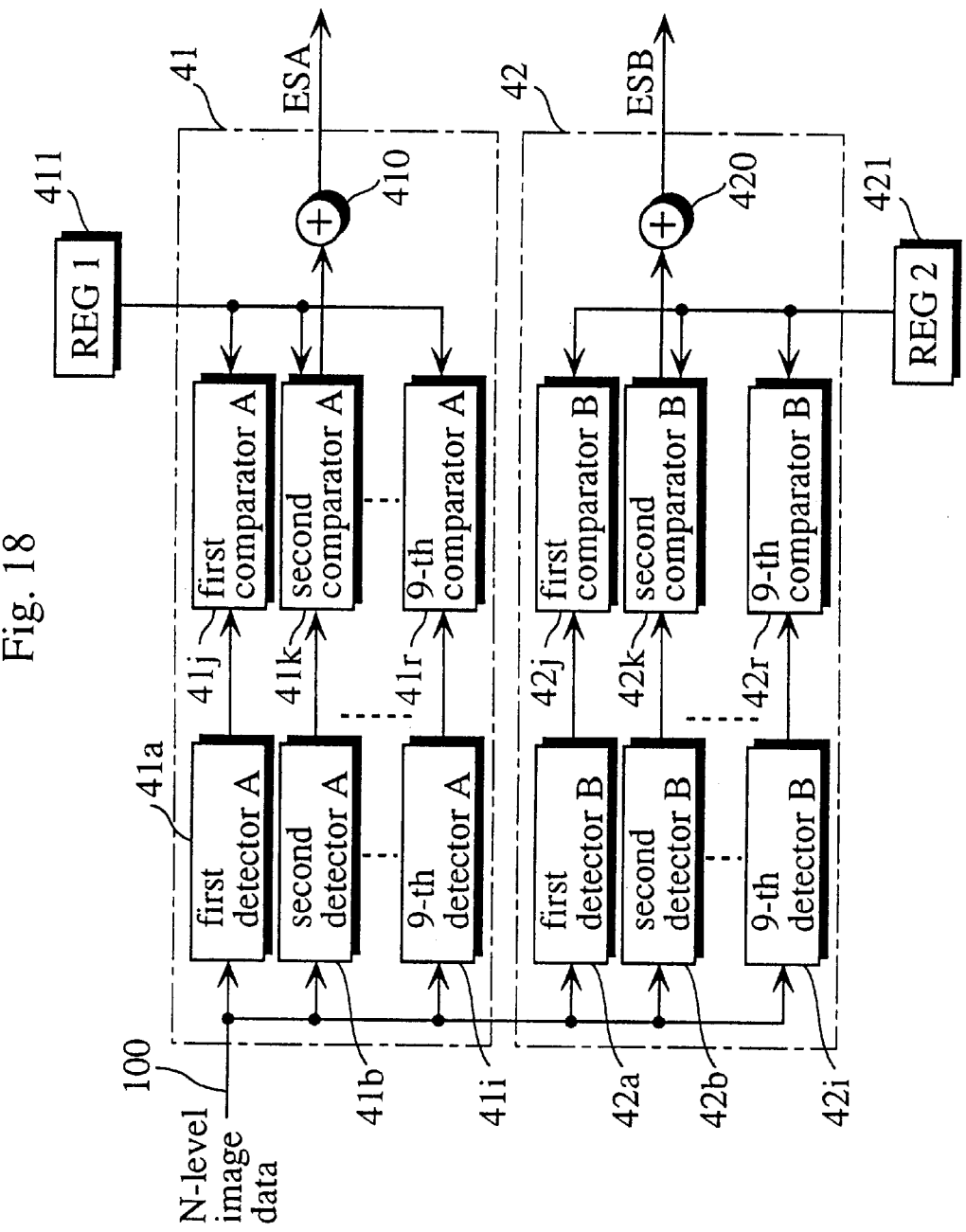
FIG. 18 is a block diagram depicting an improvement of the edge-detection filter 41 and the edge-detection filter 42.
Figure 19:
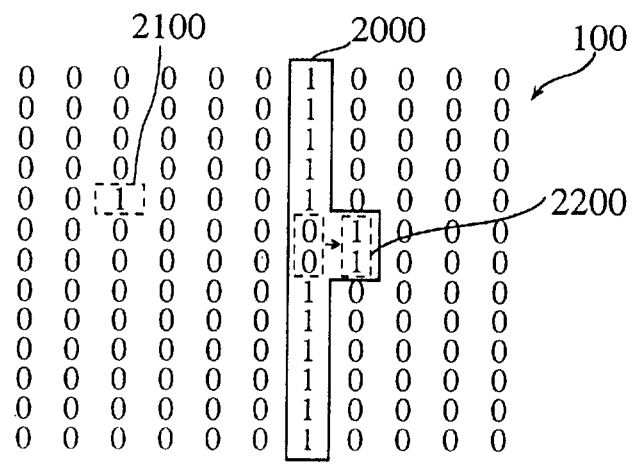
FIG. 19(a) is a pattern diagram showing binary data 100.
FIG. 19(b) shows an edge output from a fifth detector A (41a) of the edge-detection filter 41.
FIG. 19(c) shows an edge output ESA from the edge-detection filter 41.
FIG. 19(d) shows the edge output ESA from an improved edge-detection filter 41.
Figure 19:
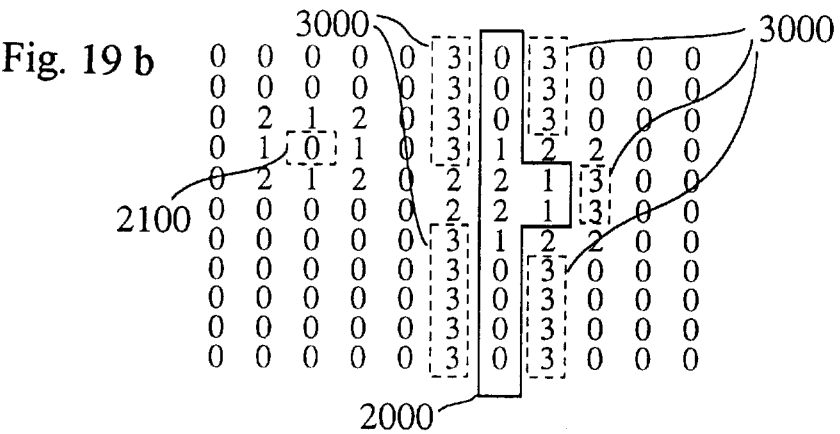
Figure 19:
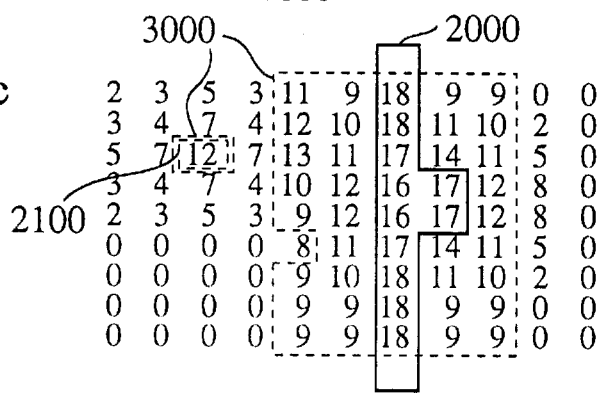
Figure 19:
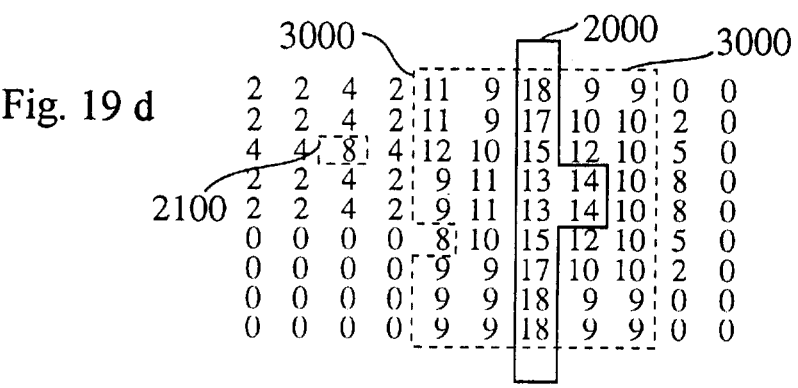

FIG. 18 shows an improvement of the recognizing circuit 4 in FIG. 16. With the recognizing circuit in FIG. 18, each of the outputs from the nine detectors (41a–41j) is compared with a value in the register 411, and the outputs which are higher than the value in the register 411 are added by the adder 410. Similarly, each of the outputs from the nine detectors (42a–42j) is compared with a value in a register 421, and the outputs which are higher than the value in the register 42 are added by the adder 420.

The effects of these improvements are explained as referring to FIGS. 19(a), 19(b), 19(c), and 19(d).

FIG. 19(a) is a pattern diagram of the binary data 100. An area 2000 represents a character.graphic area, and an area 2200 of the area 2000 shows an example where data is dispersed by binary processing, and image data of character.graphic is shifted. This data shifting does not occur with electronic data of computer graphics, but frequently occurs with an original document scanned with a scanner or the like whose document density is small or blurred. An area 2100 in a non-edge area represents an isolation point which is frequently generated by binary processing when K-level image data has a small density value. That is, if the K-level image data is converted into binary data according to digital halftone technique, such as an error-diffusion method or a dither method, a constant value in a certain area of the K-level image data is represented by the density of dots.

FIG. 19(b) illustrates outputs when edges of an image are detected by a fifth detector A (41e) of the edge-detection filter 41. The fifth detector A (41e) detects edges of an image in the main scanning direction and the sub scanning direction with the filter 4100 and 4101, and detects edges of the pixel in concern by combining the outputs from the filters 4100 and 4101. An area is recognized based on output data representing the detected edges. According to digital halftone technique, such as an error-diffusion method or a dither method, even when data is constant, it is dispersed by binary processing. Accordingly, the edge output Eg will never be "0". A judgement level is set "3" or more to reduce the effects of the isolation point area 2000 in the non-edge area (recognition error). In this case, areas 3000 enclosed with a dot line in FIG. 19(b) are detected as edge areas. Although no isolation point area 2000 is detected by mistake in FIG. 19(b), the character.graphic area 2000 is not detected, but areas located outside the area 2000 are detected. Further, the detected areas 3000 are located in isolation due to the area 2200 in FIG. 19(a) whose data is shifted by binary processing. The size of an area to be detected can be increased by decreasing the judgement level to "2"; however, the isolation of the area 3000 is not solved. Also, detection errors will be increased around the isolation point area 2100.

FIG. 19(c) illustrates the edge output ESA from the edge-detection filter 41. If the comparison level CPA of the first comparing circuit 43 in FIG. 16 is set "8", an area 3000 enclosed with a dot line in FIG. 19(c) is detected as an edge area. Although the problem of an isolation point area 2100 still remains, a broad area including a picture.graphic area 2000 can be detected without a break. Also, the detected area 3000 is not influenced by the area 2000 in FIG. 19(a) where data is shifted by binary processing. Only the picture.graphic area 2000 will be detected if "15" is set as the comparison level CPA. Thus, different areas are extracted by setting different values as the comparison level CPA; accordingly, different recognition areas are obtained.

FIG. 19(d) illustrates the edge output ESA from the improved edge-detection filter 41. A comparison value (REG1) is set "1", and edge outputs Eg from the nine edge detectors (41a–41i) are compared to the comparison value by comparing circuits (41j–41r) respectively. Subsequently, the adder 410 adds the edge output Eg only when Eg>1. If "8" is set as the comparison level CPA of the first comparing circuit 43, an area 3000 enclosed with a dot line in FIG. 19(d) is detected as an edge area. The detection error of the isolation point area 2100 is avoided, also a broad area including the character.graphic area 2000 is detected without a break. Further, the detected area 3000 is not influenced by the area 2200 in FIG. 19(a) where data is shifted. For these reasons, detection accuracy is enhanced in FIG. 19(d) than in FIG. 19(c). Similarly, detection accuracy of the edge-detection filter 42 will be enhanced. Also, by setting "12" as the comparison level CPA, only the character.graphic area 2000 can be extracted. Thus, different area can be extracted by setting different values as the comparison level CPA. Accordingly, different recognition areas are obtained.

Thus, a character.graphic being an edge area is detected accurately by adding edge amounts which are detected by a plurality of edge-detection filters from a plurality of detection areas including the pixel in concern, then comparing the added result with a certain level. Further, dispersion of data generated during binary processing will not influence the detection any longer if edge amounts detected by edge-detection filters are compared with a certain value, and only the edge amounts which are greater than the certain value are added. By doing so, error detection due to a texture of a binary image can be eliminated. As a result, edge detection accuracy is improved by reducing error detections in a non-edge area, while adding edge amounts in an edge area.

The recognizing circuit 4 in FIGS. 16 and 18 divides the N-level gradation image into an edge area and a non-edge area, so that different gradation conversion processing can be performed on each of the areas. Both desired resolution and uniformity can be achieved simultaneously in gradation conversion processing of the N-level gradation image by applying the most suitable gradation conversion processing to each of the areas.

Also, around an edge area, an n×m scanning aperture outputs the estimation value NA which represents an intermediate image from binary data including the character.graphic area 2000 being an edge area and a non-edge area. With respect to image quality of the intermediate image, high resolution is preferred. Therefore, the edge area must be recognized. To detect the area including the character.graphic area 2000 as an edge area, a broad area including the picture.graphic area 2000 needs to be detected without a break by the n×m scanning aperture. For this reason, the recognizing circuit 4 in FIGS. 16 and 18 which detects a broad area including the character.graphic area 2000 without a break is suitably employed in gradation level conversion.

The selecting circuit 6 is described as referring to FIG. 1.

The selecting circuit 6 selects input from the input A (signal 200), the input B (signal 300), the input C (signal 200), and the input D (signal 500 or signal 700) by the control signal 61 (CONT1) and the recognition signal 400 (signal SE), then outputs the selection signal 600.

For example, Table 1 shows selection conditions. It is assumed that the selection signal 600 is OUT. Also, the signal 400 (signal SE) is in [H] level when an edge area is detected, and it is in [L] level when a non-edge area is detected

TABLE 1

| CONT1 | S E | OUT | PROCESSING MODE |
|---|---|---|---|
| 0 | L | A | picture |
|  | H | B |  |
| 1 | L | C | character picture |
|  | H | D |  |
| 2 | L | B | character |
|  | H | D |  |

In Table 1, the control signal 61 (signal CONT1) has three signal levels. The selecting circuit 6 selects input according to a level of the control signal 61. When the signal level is "0", the input A is selected for a non-edge area, and the input B is selected for an edge area. When the signal level is "1", the input C is selected for a non-edge area, and the input D is selected for an edge area. When the signal level is "2", the input B is selected for a non-edge area, and the input D is selected for an edge area.

Since gradation characteristics are taken seriously in "picture mode", the inputs A and B are selected, and enhancement of an edge area is not performed. Since resolution and gradation are taken seriously in "character.picture mode", the inputs C and D are selected, and enhancement of an edge area is performed. Since resolution is taken seriously in "character mode", the inputs B and D are selected, and enhancement of an edge area is performed.

Processing modes in Table 1 are set with a control panel 91, and the controlling circuit 92 sets the respective control signal 61 (CONT1). Accordingly, conversion from the N-level gradation image into the M-level gradation image (N<M) can be performed with images in different processing modes.

Also, the output signal 500 from the enhancing circuit 5 can be replaced with the output signal 700 from the data converting circuit 7. The data converting circuit 7 eliminates an estimation value which is obtained supposedly for pixels located at either one end row or one end column from the estimation value NA beforehand. Therefore, a scanning aperture is reduced equivalently during data conversion. As a result, the degree of sharpness is enhanced.

Thus, according to the gradation level converting device with the configuration set forth above, edge deterioration is reduced in an edge area, and desired smoothness can be obtained in a non-edge area of the obtained M-level gradation image (N<M).

Embodiment 2

A gradation level converting device in a second embodiment of the present invention is described as referring to the drawings.

Figure 20:
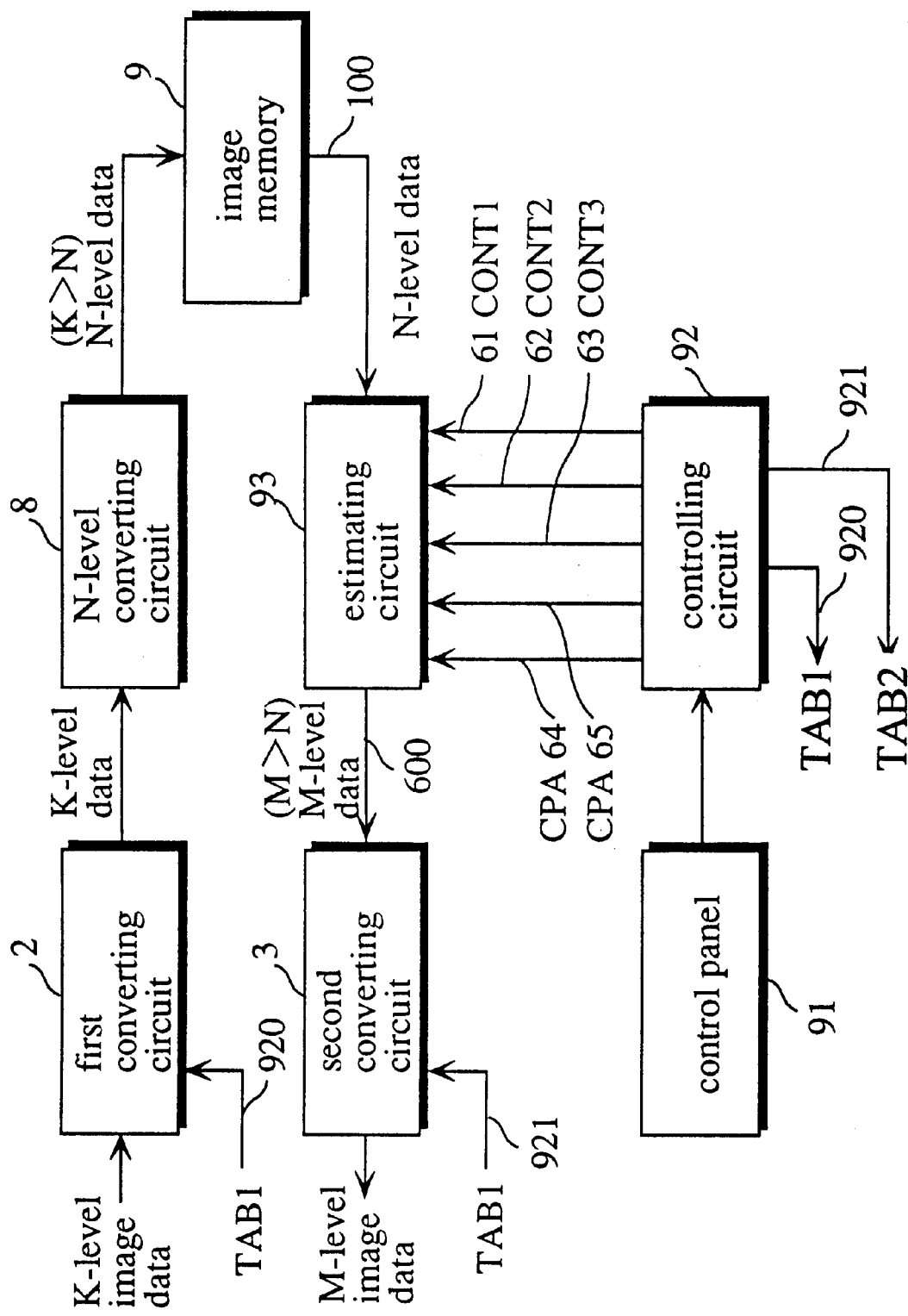
FIG. 20 is a block diagram depicting a gradation level converting device in a second embodiment.

FIG. 20 is a block diagram depicting the gradation level converting device in the second embodiment.

Although the N-level gradation image data is converted into the M-level gradation image data in the first embodiment, K-level gradation image data (K>N) is converted into the N-level gradation image data, then the converted N-level gradation image data is converted into the M-level gradation image data in this embodiment. For example, this device is suitably employed in an image storing system where the high level (K level) gradation image data is converted into the low level (N level) gradation image data to be stored into a disc, then the low level gradation image data is returned into the high-level (M level) gradation image in reading.

In FIG. 20, a first converting circuit 2 comprises an LUT stored in an RAM, and it converts the K-level image data according to a conversion table which is set by a controlling circuit 92 via a control signal 920 (signal TAB1). The first converting circuit 2 will be described in detail later in the description of operation.

An N-level converting circuit 8 converts the K-level image data from the first converting circuit 2 into the N-level gradation image data (K>N).

An image memory 9 is a semi-conductor memory, a hard disk device, or the like, and it stores the N-level gradation image data received from the N-level converting circuit 8.

An estimating circuit 93 is utilized in the place of the gradation level converting device in FIG. 1 relating to the first embodiment, and it converts the N-level gradation image data from the image memory 9 into the M-level gradation image data 600 (N<M).

A second converting circuit 3 is an LUT such as an RAM, and it converts the M-level gradation image data according to a conversion table set by a controlling circuit 92 via a control signal 921 (signal TAB 2). The second converting circuit 3 is described in detail later in the description of operation.

The controlling circuit 92 outputs control signals to the estimating circuit 93, the first converting circuit 2, and the second converting circuit 3 according to setting signals from a control panel 91.

For example, the control panel 91 comprises a plurality of keys, and outputs setting signals according to the settings of an input switch at the control circuit 92 which include the setting of resolution level of an image, and the mode settings between "picture image mode", "character.picture image mode", "character image mode", "character.graphic image mode" and "mesh-dot image mode".

The operation of the thus constructed gradation level converting device is described.

Figure 21:
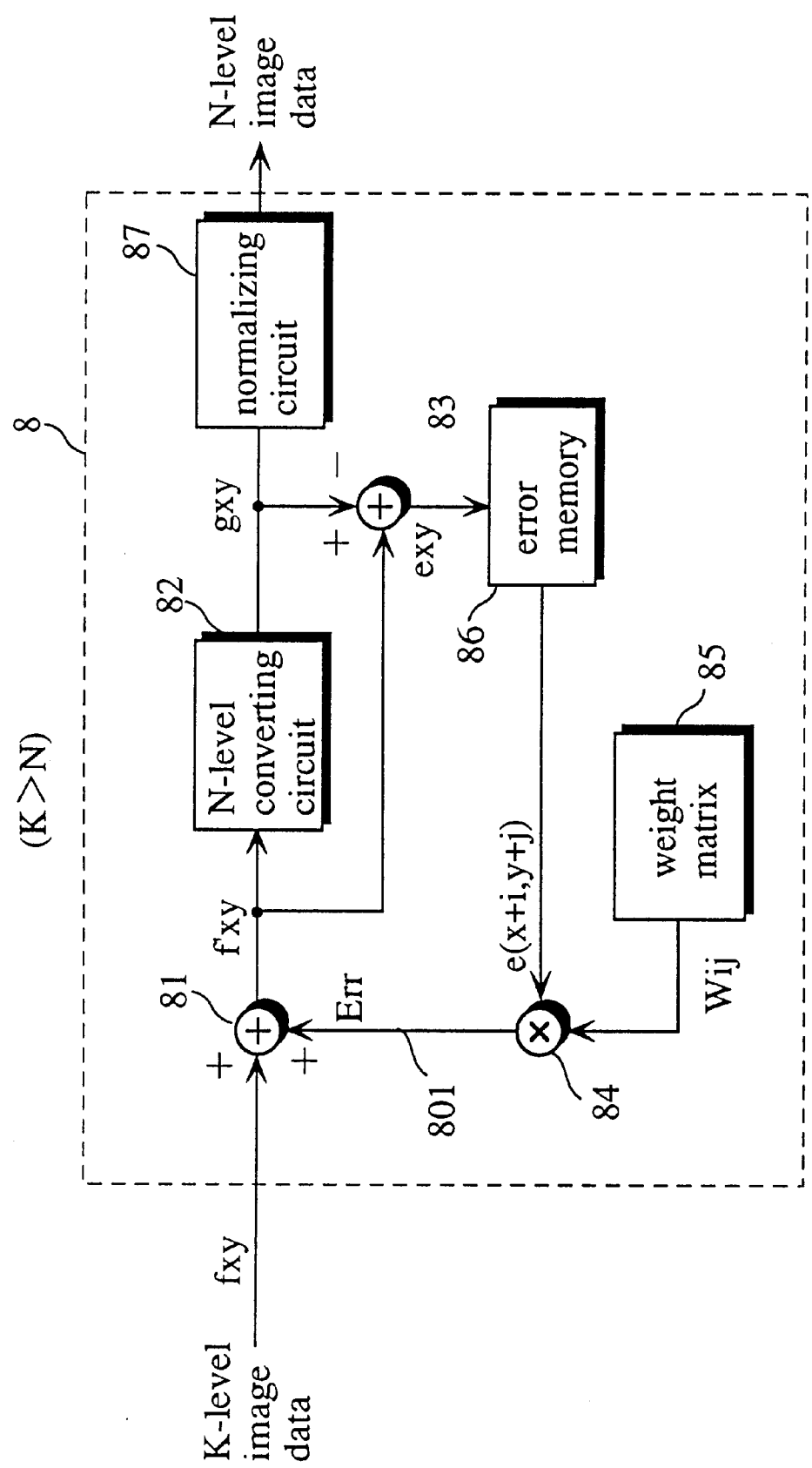
FIG. 21 is a block diagram depicting an N-level converting circuit 8.

The configuration of the N-level converting circuit 8 for converting the K-level image into the N-level image (K>N) is described as referring to FIG. 21. A dither method or an error diffusion method may be employed to convert the K-level image into the N-level image. In this embodiment, the K-level image data is converted into the N-level image data according to the error dispersion method shown in FIG. 21.

In FIG. 21, K-level image data fxy is added to an integration error value Err located around a pixel in concern by an adder 81, and the adder 81 outputs f'xy. The output f'xy is compared to a plurality of threshold values which are set by the N-level converting circuit 82 beforehand so that the output f'xy is quantized into an N value, and the N-level converting circuit 82 outputs gxy. The adder 83 operates exy=f'xy-gxy; an quantization error is distributed to around the pixel in concern with some weighing coefficient, and it is stored into an error memory 86. A multiplier 84 multiplies an error e(x+i, y+j) which is distributed around the pixel in concern by a weighing coefficient of a weight matrix Wij, and outputs the integration error value Err. A signal 801 is expressed by Err=ΣΣe(x+i, y+j)·Wij. For example, when N=2, gxy outputs binary data of "0" and "255" , and a normalizing circuit 87 normalizes the binary data of "0" and "255" into binary data of "0" and "1" . Accordingly, the K-level image data is converted into the N-level image data.

When a halftone image which is generated according to the error-diffusion method in FIG. 21 is employed as an input image to an estimating circuit 93, estimation can be restored with desired resolution and gradation without any deterioration of edges or any false gray-scale contour. Although the error diffusion method is employed herein, other methods of storing average data value of an image can be employed. More specifically, a well-known N-level converting means (K>N) can be employed. For example, an average error minimizing method, a dither method, and a multi-value dither method may be employed instead.

Figure 22A:
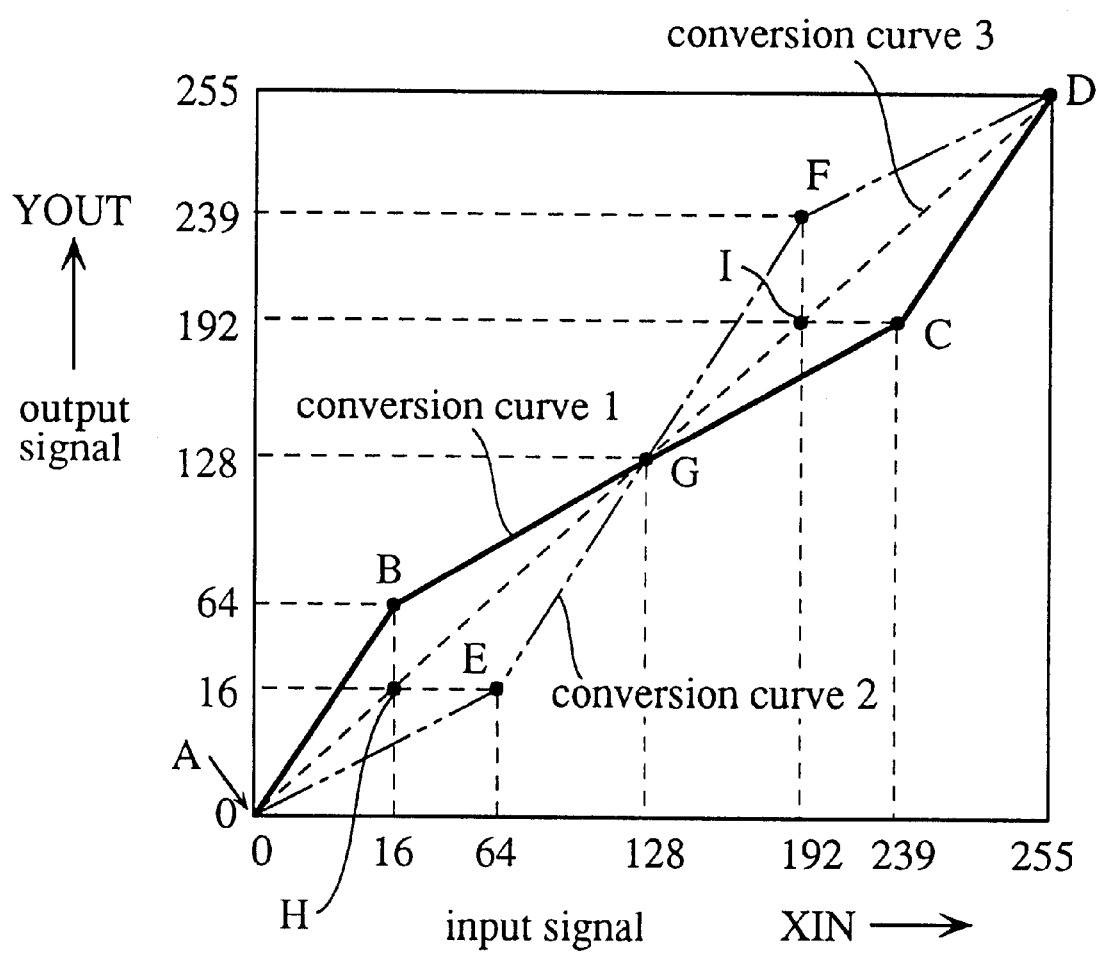
FIG. 22(a) illustrates the operation of a first converting circuit 2 and a second converting circuit 3.
Figure 22B:
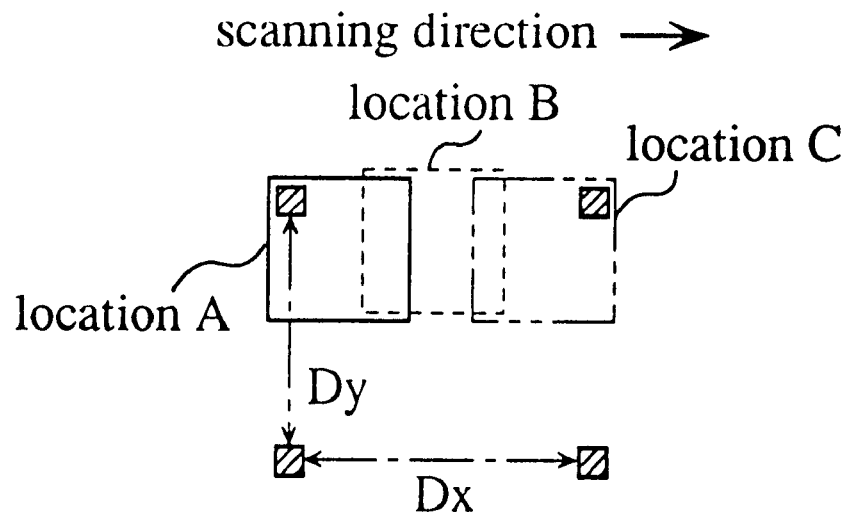
FIG. 22(b) shows a relation between the location of a scanning aperture and the location of a pixel before conversion.
Figure 22C:
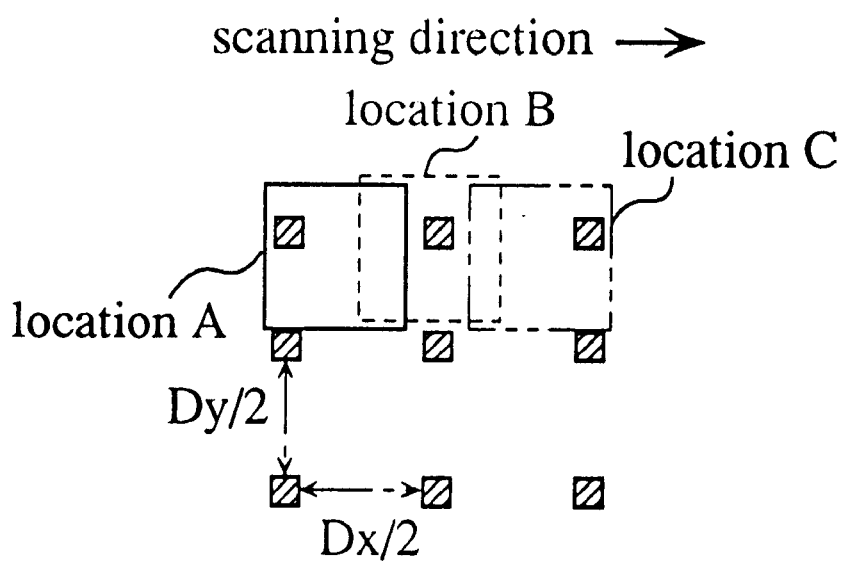
FIG. 22(c) shows a relation between the location of a scanning aperture and the location of a pixel after conversion.
Figure 24:
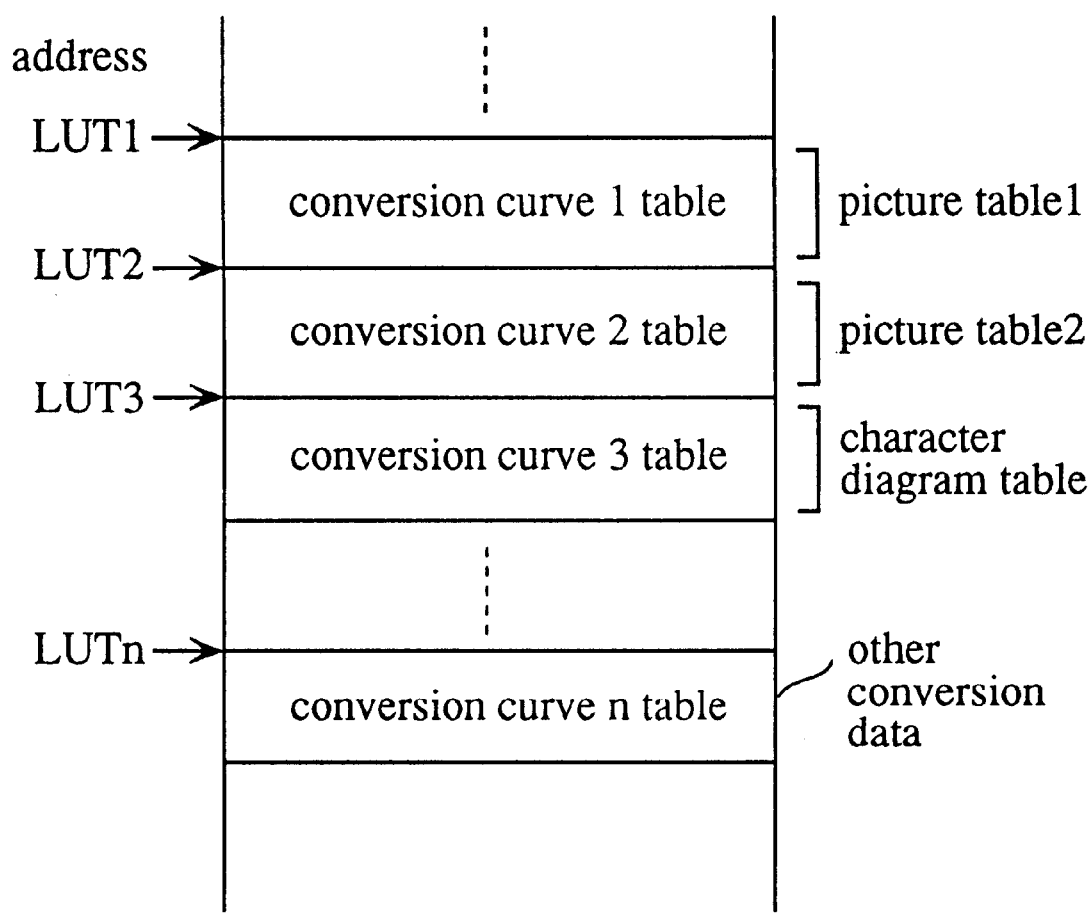
FIG. 24 illustrates a conversion table.

The first converting circuit 2 and the second converting circuit 3 are described as referring to FIGS. 22–24. FIG. 22(a) shows the conversion operation of the first converting circuit 2 and the second converting circuit 3; FIG. 22(b) shows relation between the location of a scanning aperture and the location of black pixels; FIG. 23 illustrates data conversion; and FIG. 24 illustrates a conversion table.

N=2, M=256, and K=256 are set supposedly in the second embodiment although they can be other values. Also, for convenience of the description, the estimation value NA is applied to the first multi-level converting circuit 11 of the gradation level converting circuit 1 in FIG. 2. Estimation operation is described as assuming that the filter 1110 with a 2×2 scanning aperture is applied to the first adding circuit 111, and every weighing coefficient is 1. The first normalizing circuit 112 substitutes Ma=4, M=256 to the expression 5, and outputs the estimation value NA. (M−1)/Ma is around 64, so that 64 data value is estimated for one black pixel within the 2×2 aperture area.

A conversion curve 3 in FIG. 22(*a*) is set to the first converting circuit 2 and the second converting circuit 3. Yout=Xin for input signal Xin and output signal Yout is satisfied with the conversion curve 3. Stated otherwise, it is a conversion table for utilizing an input signal as an output signal.

The estimating circuit 93 estimates the M-level gradation image from the N-level gradation image (N<M). The K-level image which is inputted to the N-level converting circuit 8 will be estimated if K=M. The N-level converting circuit 8 converts density data of the pixel in concern into binary data of "0" and "255", and disperses a generated error to pixels surrounding the concerned pixel. Binary data of "0" and "255" is normalized into binary data of "0" and "1", and it is stored in the image memory 9. According to this binary quantization processing, 8 bits/pixel is converted into 1 bit/pixel; accordingly, data capacity is compressed into ⅛. The compressed image has a bit map structure, and a compressing rate is a fixed length. Compared to compression at a variable length compressing rate, compression at a fixed length compressing rate is more suitable for conversion in real time since a compression time is constant. Also, image data in the image memory 9 has a bit map structure, and the process of expanding an image which was compressed at a variable length compressing rate can be eliminated. Consequently, edition can be performed at a high speed. If this binary data is outputted to an output device which expresses "0" by a white dot and "1" by a black dot, or to a display device which expresses "1" by a white dot and "0" by a black dot, a digital halftone image based on compression of dots can be obtained.

The first multi-level converting circuit 11 estimates the M-level gradation image from binary data of "0" and "1" stored in the image memory 9. For example, the K-level image data with a certain value "16" is converted into normalization data "0" and "1" by the N-level converting circuit 8. If "0" and "1" are expressed by a white pixel and a black pixel, respectively, binary data of "0" and "1" in FIG. 22(*b*) which is Dx distance in the main scanning direction and is Dy distance in the sub scanning direction is obtained. The first multi-level converting circuit 11 estimates the M-level gradation image by adding data values within an aperture, and performing the normalization. When the scanning aperture is 2×2, and every weighing coefficient to be added is 1, M=256 and Ma=4; accordingly, a black dot "1" is converted into data value 64 by the expression 4.

When the K-level data is small, that is being within a high-light area of the image, the scanning aperture size is smaller than a diffusion range of black pixels ("1" of binary data), and the estimation value NA varies depending on where to scan. For a scan position A, a scan position B, and a scan position C in FIG. 22(*b*), the estimation value is 64, 0, and 64, respectively. Thus, with respect to the K-level image data of a certain value "16", the estimation value is not constant. Similarly, in a shadow area, the aperture size is smaller than a dispersion range of white pixels ("0" of binary data), and the estimation value NA is fluctuated.

To reduce the fluctuation of the estimation value NA in a high-light area and a shadow area, a conversion curve 1 and a conversion curve 2 in FIG. 22(*a*) are set to the first converting circuit 2 and the second converting circuit 3, respectively.

A principle of the conversion is described as referring to FIGS. 22(*a*), (*b*), and (*c*). Conversion of the K-level image data at a point H in FIG. 22(*a*) is described. Also, "0" and "1" of binary data are illustrated by a white and a black pixel, respectively.

As shown in FIG. 22(*a*), input data (point H) whose value is 16 is multiplied by four to be output data (point B). This quadrupled K-level image data is converted into "0" and "1" by the N-level converting circuit 8. Theoretically, the input data is quadrupled, so that the density of black pixels is quadrupled, and it is converted into binary data of "0" and "1" which is Dx/2 distance in the main scanning direction and is Dy/2 distance in the sub scanning direction in FIG. 22(*c*). The estimation value NA is 64, 64, and 64 for the positions A, B, and C in FIG. 22(*c*). Since the K-level image data is multiplied by four by the conversion curve 1, they are divided by four by a conversion curve 2 (point E); accordingly, the estimation value becomes 16, 16, and 16 for the positions A, B, and C respectively. Consequently, fluctuation in the estimation value NA is reduced.

A point G in FIG. 22(*a*) is a median of a signal range for the K-level image data, and it is located at 128 when an input signal is within the signal range between 0 and 255. The first converting circuit 2 converts the K-level image data to be greater than a line AG in a high-light area (for example, a curve linking points A, B, and G), and converts the K-level image data to be smaller than a line GD in a shadow area (for example, a curve linking points G, C, and D). Accordingly, a diffusion range of black pixels ("1" of binary data) in a high-light area and a diffusion range of white pixels ("0" of binary data) in a shadow area are reduced.

The second converting circuit 3 returns the converted result from the first converting circuit 2 into the original value. The second converting circuit 3 returns the converted value represented by the curve ABG in a high-light area which is smaller than the point G to a curve linking points A, E, and G, and returns the converted value represented by the curve GCD in a shadow area which is greater than the point G to a curve linking points G, F, and D.

Thus, by converting the K-level image data to center around a median of the signal range with the first converting circuit, and returning the estimation value NA for the M-level image data into the original value by the second converting circuit 3, fluctuation in the estimation value NA in either a high-light area or a shadow area is reduced.

The principle of the conversion processing is set forth above, and it is detailed as referring to FIGS. 23(*a*)–23(*f*).

FIG. 23(*a*) shows the K-level image data in an embodiment.

A maximum value and a minimum value of the K-level image data are 255 and 0 in the following description. A certain value "16" which is around 1/16 of the maximum value 256 is processed.

FIG. 23(*b*) shows an example of the binary data 100 which is obtained by performing binary converting on the K-level image data in FIG. 23(*a*) by the N-level converting circuit 8. As shown in FIG. 23(*a*), a single "1" exists in an area A(4×4) of the binary image data.

FIG. 23(*c*) shows the estimation value NA which is estimated by the first multi-level converting circuit 11 from the binary data 100 in FIG. 23(*b*). Although an average value of the area A is "16" and the K-level image data is estimated from this average value, the estimation value in each of the pixel positions fluctuates largely, that is between 0 and 64.

FIG. 23(*d*) shows the binary data 100 which is obtained by multiplying the K-level image data "16" in FIG. 23(*a*) by four with a conversion curve 1 (conversion 1), and performing binary processing on "64" which is around ¼ of the maximum value 255 by the N-level converting circuit 8. Four "1"s exist in the area A of the binary data in FIG. 23(*d*).

FIG. 23(e) shows the estimation value NA which is estimated from the binary data 100 in FIG. 23(d) by the first multi-level converting circuit 11.

FIG. 23(f) shows an output which is obtained by reducing the estimation value NA in FIG. 23(e) into ¼ by a conversion curve 2 (conversion 2). Thus, the estimation value NA in FIG. 23(e) is reduced in ¼ since the N-level converting circuit 8 multiplied the K-level image data input by four with the conversion curve 1 (conversion 1). The estimation value NA in each of the pixel locations does not fluctuate in the area A in FIG. 23(e), also the K-level image data "16" is estimated accurately.

The effects of the conversion is described. Compared to the estimation value NA without any conversion in FIG. 23(c), fluctuation in the estimation value NA is surely suppressed in FIG. 23(f) because of the conversion by the first converting circuit 2 and the second converting circuit 3. Further, the accurate estimation value is obtained. Especially, these effects are significant in a high-light area and a shadow area where binary data are likely to diffuse.

Thus, the K-level image data is converted to center around a median of a signal range by the first converting circuit 2, then the converted K-level image data is converted into the N-level data (K>N). Therefore, diffusion range of black pixels and white pixels can be suppressed in a high-light area and a shadow area, respectively. Also, by returning the estimation value NA for the M-level data (N<M) which is obtained from the N-level data, fluctuation in the estimation value is avoided in a high-light area and a shadow area. Further, the estimation value can be obtained accurately. Accordingly, a diffusion range of data which occurs during binary processing by the N-level converting circuit 8 is controlled, and diffusion ranges of white pixels "0" and black pixels "1" are suppressed to be within a short distance from the pixel in concern. Consequently, the estimation value NA with little regional fluctuation can be obtained.

The first converting circuit 2 and the second converting circuit 3 suppress diffusion ranges of white pixels "0" and black pixels "1" in a high-light area and a shadow area, respectively so that data is diffused within a short distance from the pixel in concern. Accordingly, the estimation value NA can be obtained as suppressing regional fluctuation.

Also, by suppressing diffusion ranges of white pixels "0" and black pixels "1" from the pixel in concern in a high-light area and a shadow area respectively with the first converting circuit 2 and the second converting circuit 3, fluctuation in the estimation value can be suppressed even if a scanning aperture is reduced. By reducing the size of a scanning aperture, the size of a circuit is reduced, so that resolution is enhanced.

When the M-level image data with few fluctuation in the estimation value is outputted to an output device or to a display device, a high quality digital halftone image with little ununiformity in density can be obtained.

Although the gradation level converting device in FIG. 1 is employed as the estimating circuit 93, the gradation level converting circuit 1, the first multi-level converting circuit 11, or the multi-level converting circuit 12 in FIG. 2 may take the place of the estimating circuit 93. That is, the present invention can be applied to every device for converting the N-level gradation image into the M-level gradation image (N<M) by estimating a multi level from a pixel value within a certain scanning aperture.

Also, fluctuation amount in the estimation value is determined by a conversion amount by the first converting circuit 2 and an aperture size of the filter 1110 of the first adding circuit 111. If the aperture size is constant, greater effects are obtained by a larger conversion amount; however, a change in a line BC in FIG. 22(a) is reduced, and a detection amount for an edge component is suppressed. This is more significant with a device for controlling the aperture size according to a detected edge component. For example, a greater change in the line BC is desirable in a character image and a graphic image.

Accordingly, to be responsive to different images, control keys by which "processing mode" is selected are constructed on the control panel 91, and the setting signals which correspond to the control keys are outputted to the controlling circuit 92. The controlling circuit 92 has a conversion memory internally, and stores a plurality of conversion tables. In responsive to "processing mode" which is set with the control panel 91, a conversion table is set to the first converting circuit 2 and the second converting circuit 3 via the signals 920 and 921.

As shown in FIG. 24, for example, a conversion table for adjustment of image quality is stored in the conversion memory. When "pictuer.graphic mode" which takes edges seriously is set, a table for the conversion curve 3 is read from a head address of an LUT 3. Subsequently, the conversion table is set to the first converting circuit 2 via the signal 920, and to the second converting circuit 3 via the signal 921.

Similarly, if "picture mode" which takes smoothness seriously is set, a table for the conversion curve 1 is read from a head address of the LUT 1, and it is set to the first converting circuit 2 via the signal 920. Simultaneously, a table for the conversion curve 2 is read from a head address of the LUT 2, and it is set to the second converting circuit 3 via the signal 921.

As shown in FIG. 24, different images can be processed and image quality is adjusted by storing a plurality of conversion tables in the conversion memory.

Further, the estimating circuit 93 can process different images and adjust image quality by controlling the control signals 61–65 from the controlling circuit 92. The operation of the estimating circuit 93 is described as referring to FIG. 16, Tables 1, and 2.

TABLE 2

| CONT1 | CONT2 | CONT3 | CPA | CPB | PROCESSING MODE |
|---|---|---|---|---|---|
| 0 | L | L | — | — | picture |
| 1 | L | H | — | B1 | character picture |
| 2 | H | H | A2 | B2 | character |

As shown in Table 2, the control signal 61 (signal CONT1) selects an estimation output according to "processing mode", such as the presence or absence of enhancement (or the presence or absence of data conversion). The control signal 62 (signal CONT 2) and the control signal 63 (signal CONT 3) control the recognition signal 400 in FIG. 16. The control signal 63 (signal CONT 3) controls the AND circuit 45 in FIG. 16, and controls validity (invalidity) of the compared result from the first comparing circuit 43. The control signal 63 (signal CONT 3) also controls the AND circuit 63 in FIG. 16, and controls validity (invalidity) of the compared result from the second comparing circuit 44. "H" and "L" levels represent validity and invalidity, respectively. The comparison levels CPA and CPB control recognition levels. When the comparison levels (CPA, CPB) are increased, greater edge detection levels are required, so that a recognition area is limited. In contrary, when the comparison levels (CPA, CPB) are decreased, recognition can be performed according to smaller edge detection levels, so that a recognition area is broadened.

A control value which is the most suitable for each "processing mode" is set with these control signals.

Smoothness is taken seriously in "picture mode", so that recognition is not performed. Accordingly, "L" is set both to the CONT2 and CONT3. In this setting, the comparison levels CPA and CPB are invalid.

Since both resolution in a character area and smoothness in a picture area are taken seriously in "character.graphic mode", recognition is performed. However, considering a recognition error due to a mesh-dot point image whose spatial frequency is spread in a wide range, the recognition signal which employs the edge-detection filter 41 with high recognition frequency is judged to be invalid, and a recognition signal which employs the edge detection filter 42 with recognition frequency which is smaller than mesh-dot frequency and with few recognition error due to a mesh-dot frequency is judged to be valid. Accordingly, "L" and "H" are set to the CONT 2 and CONT 3, respectively. In this setting, a value of the comparison level CPA is invalid, and a value of the comparison level CPB is valid.

Recognition is performed in "character mode" since resolution of a character area is taken seriously. Further, to obtain the recognition signal for detecting spatial frequency in a wide range, the detected results from the edge-detection filter 41 and the edge-detection filter 42 are validated. Accordingly, "H" is set both to the CONT 2 and the CONT 3. In this setting, values of the comparison levels CPA and CPB are valid. Further, to enlarge an edge detection area, a value of the comparison level CPB is shifted from B1 to B2 (B1>B2).

A plurality of image quality setting keys are constructed at the control panel 91. With these setting keys, the controlling circuit 92 adjusts image quality by setting the comparison levels CPA and CPB at a plurality of setting steps, and controlling a recognition area.

Thus, in the second embodiment, the estimating circuit 93 can process various types of images and adjusts image quality by controlling the control signals 61 through 65. Therefore, in converting the N-level gradation image into the M-level gradation image (N<M), the conversion processing is performed in responsive to different images, and image quality is adjusted to be desirable in the conversion processing. Consequently, the high quality M-level gradation image (N<M) can be generated.

The edge area detecting means in the first embodiment and the second embodiment is not influenced by fluctuation in dispersion of data in converting the K-level image into the N-level image (K>N). Therefore, an edge area and a non-edge area of the N-level gradation image can be recognized accurately.

Further, a means for processing differently an edge area and a non-edge area of the N-level image is included, so that the optimal M-level image (N<M) can be estimated both in an edge area and a non-edge area of the N-level image (N<M).

Also, a converting means for suppressing a diffusion range of data in a high-light area or a shadow area in converting the K-level image into the N-level image (K>N) is included, and the N-level image data is estimated from the converted N-level image data. As a result, fluctuation in the estimation value can be suppressed.

A means for performing conversion which is the most suitable for each of different images in converting the N-level gradation image into the M-level gradation image (N<M), and a means for adjusting image quality desirably are included. With these means, the high quality M-level gradation image (N<M) can be generated.

By applying the present invention to a copy machine, a printer, a display device, a FAX, and a document file, recording and transfer of data can be performed as reducing an image data capacity, and a high quality estimation image can be obtained at output and display stages. The present invention can be applied not only to black-and-white images, but also to colored images at a output device, a display device, and a FAX. Similarly, an image data capacity can be reduced as maintaining high image quality. The same operation is applied to each of the colors in an RGB image or a YMC image.

The area recognizing device and the gradation level converting device in the first and the second embodiments of the present invention can be implemented by operation processing (software processing) which employs a CPU or a DSP.

If image data is compressed or expanded by the gradation level converting device in the present invention, coding at a fixed length coding rate is achieved, and a bit map structure is maintained in the coded image data. The coding is completed within a fixed time if data is coded at a fixed length rate; accordingly, this coding is suitable for a device which processes in real time. Further, by maintaining a bit map structure, over-writing can be performed at any location of an image recording device. Since the process of expanding a compressed image can be omitted, the edition can be performed at a high speed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A gradation level converting device for converting an image which is expressed by an N gradation level into an image which is expressed by an M gradation level (N<M), the gradation level converting device comprising:

a first smoothing filter which comprises a scanning aperture which includes a pixel in concern and pixels which are located around the pixel in concern of the N-level gradation image and converts the N-level gradation image into the M-level gradation image by multiplying each of the pixels within the scanning aperture by a certain weighing coefficient and adding the multiplied pixels;

a second smoothing filter possessing the degree of smoothness which is greater than the first smoothing filter since an aperture size and a weighing coefficient are different from the first smoothing filter, and converting each of the pixels from the N gradation level into the M gradation level according to the degree of smoothness;

an edge detecting means for detecting an edge component of the pixel in concern according to each of the first smoothing filter and the second smoothing filter;

a mixing ratio calculating means for calculating a mixing ratio from the detected result of the edge detecting means;

a mixing means for mixing the converted result outputted from the first smoothing filter and the converted result outputted from the second smoothing filter based on the calculated mixing ratio;

an area recognizing means for recognizing the edge area and the non-edge area of the N-level gradation image; and a selecting means for selecting the mixed result outputted from the mixing means for the non-edge area of the N-level gradation image and selecting the converted result from the first smoothing filter for the edge area as referring to the recognized result from the area recognizing means.

2. The gradation level converting device of claim 1, wherein the area recognizing means comprises:

a plurality of filters each of which detects an edge component of a pixel in concern as referring to a value of a pixel within an area including the pixel in concern, the filters possessing an identical edge detection characteristic and the pixel concern in each of the filters being set at a different location in the N-level gradation image;

an adding means for comparing output from each of the plurality of filters with a certain value, and adding the output only when it is greater than the certain value;

a judging means for comparing the added result from the adding means with a certain judgement level, and outputs the compared result as a judgement; and a recognizing means for recognizing a part of the image at which each of the filters is located as the edge area when the judgement outputted from the judging means is a first judgement, and recognizing it as the non-edge area when the judgement is a second judgement level.

3. The gradation level converting device of claim 2 further comprising:

a setting means for setting a plurality of processing modes, or an image quality adjustment value; and a first controlling means for controlling the certain judgement level according to a setting by the setting means.

4. The gradation level converting device of claim 1, wherein the area recognizing means comprises:

a plurality of first filters each of which detects an edge component of a pixel in concern as referring to a value of a pixel within an area including the pixel in concern, the filters possessing an identical edge detection characteristic and the pixel concern in each of the filters being set at a different location in the N-level gradation image;

a plurality of second filters which possess an identical edge detection characteristic which is different from the plurality of first filters, and the pixel in concern in each of the filters is set at a different location in the N-level gradation image;

a first adding means for adding the detected result outputted from each of the plurality of first filters;

a second adding means for adding output from each of the plurality of second filters;

a first judging means for comparing the added result outputted from the first adding means with a first judgement level, and outputs the compared result as a judgement;

a second judging means for comparing the added result from the second adding means with a second judgement level, and outputs the compared result as a judgement; and an area recognizing means for recognizing whether a part of the image where the filter is located is the edge area or the non-edge area according to the judgements from the first judging means and the second judging means.

5. The gradation level converting device of claim 4 further comprising:

a setting means for setting a plurality of processing modes, or an image quality adjustment value; and a second control means for controlling validity of the judgement from one of the first judging means and the second judging means according to a setting by the setting means.

6. A gradation level converting device for converting an image which is expressed by an N gradation level into an image which is expressed by an M gradation level (N<M), the gradation level converting device comprising:

a first smoothing filter which comprises a scanning aperture which includes a pixel in concern and pixels which are located around the pixel in concern of the N-level gradation image and converts the N-level gradation image into the M-level gradation image by multiplying each of the pixels within the aperture by a certain weighing coefficient and adding the multiplied pixels;

a second smoothing filter possessing the degree of smoothness which is greater than the first smoothing filter since an aperture size and a weighing coefficient are different from the first smoothing filter, and converting each of the pixels from the N gradation level into the M gradation level according to the degree of smoothness;

an edge detecting means for detecting an edge component of the pixel in concern according to each of the first smoothing filter and the second smoothing filter;

a mixing ratio calculating means for calculating a mixing ratio from the detected result of the edge detecting means;

a mixing means for mixing the converted result outputted from the first smoothing filter and the converted result outputted from the second smoothing filter based on the calculated mixing ratio;

an enhancing means for enhancing the M-level gradation image outputted from the first smoothing filter, and outputting the enhanced image;

an area recognizing means for recognizing the edge area and the non-edge area of the N-level gradation image; and a selecting means for selecting the mixed result outputted from the mixing means for the non-edge area of the N-level gradation image and selecting the converted result from the enhancing means for the edge area as referring to the recognized result from the area recognizing means.

7. The gradation level converting device of claim 6, wherein the area recognizing means comprises:

a plurality of filters each of which detects an edge component of a pixel in concern as referring to a value of a pixel within an area including the pixel in concern, the filters possessing an identical edge detection characteristic and the pixel concern in each of the filters being set at a different location in the N-level gradation image;

an adding means for comparing output from each of the plurality of filters with a certain value, and adding the output only when it is greater than the certain value;

a judging means for comparing the added result from the adding means with a certain judgement level, and outputs the compared result as a judgement; and a recognizing means for recognizing a part of the image at which each of the filters is located as the edge area when the judgement outputted from the judging means is a first judgement, and recognizing it as the non-edge area when the judgement is a second judgement level.

8. The gradation level converting device of claim 7 further comprising:

a setting means for setting a plurality of processing modes, or an image quality adjustment value; and a first controlling means for controlling the certain judgement level according to a setting by the setting means.

9. The gradation level converting device of claim 6, wherein the area recognizing means comprises:

a plurality of first filters each of which detects an edge component of a pixel in concern as referring to a value of a pixel within an area including the pixel in concern, the filters possessing an identical edge detection characteristic and the pixel concern in each of the filters being set at a different location in the N-level gradation image;

a plurality of second filters which possess an identical edge detection characteristic which is different from the plurality of first filters, and the pixel in concern in each of the filters is set at a different location in the N-level gradation image;

a first adding means for adding the detected result outputted from each of the plurality of first filters;

a second adding means for adding output from each of the plurality of second filters;

a first judging means for comparing the added result outputted from the first adding means with a first judgement level, and outputs the compared result as a judgement;

a second judging means for comparing the added result from the second adding means with a second judgement level, and outputs the compared result as a judgement; and an area recognizing means for recognizing whether a part of the image where the filter is located is the edge area or the non-edge area according to the judgements from the first judging means and the second judging means.

10. The gradation level converting device of claim 9 further comprising:

a setting means for setting a plurality of processing modes, or an image quality adjustment value; and a second control means for controlling validity of the judgement from one of the first judging means and the second judging means according to a setting by the setting means.

11. A gradation level converting device for converting an image which is expressed by an N gradation level into an image which is expressed by an M gradation level (N<M), the gradation level converting device comprising:

a first smoothing filter which comprises a scanning aperture which includes a pixel in concern and pixels which are located around the pixel in concern of the N-level gradation image and converts the N-level gradation image into the M-level gradation image by multiplying each of the pixels within the scanning aperture by a certain weighing coefficient and adding the multiplied pixels;

a second smoothing filter possessing the degree of smoothness which is greater than the first smoothing filter since an aperture size and a weighing coefficient are different from the first smoothing filter, and converting each of the pixels from the N gradation level into the M gradation level according to the degree of smoothness;

an edge detecting means for detecting an edge component of the pixel in concern according to each of the first smoothing filter and the second smoothing filter;

a mixing ratio calculating means for calculating a mixing ratio from the detected result of the edge detecting means;

a mixing means for mixing the converted result outputted from the first smoothing filter and the converted result outputted from the second smoothing filter based on the calculated mixing ratio;

a first filter output changing means for changing the converted result outputted from the first smoothing filter based on a sum of preset weighing coefficients corresponding to pixels located in one end in a row direction or in a column direction within the scanning aperture including the pixel in concern and a sum of preset weighing coefficients corresponding to pixels located in one end in a row direction or in a column direction within an aperture excluding the pixel in concern;

an area recognizing means for recognizing the edge area and the non-edge area of the N-level gradation image; and a selecting means for selecting the mixed result outputted from the mixing means for the non-edge area of the N-level gradation image and selecting the converted result from the first filter output changing means for the edge area as referring to the recognized result from the area recognizing means.

12. The gradation level converting device of claim 11, wherein the area recognizing means comprises:

a plurality of filters each of which detects an edge component of a pixel in concern as referring to a value of a pixel within an area including the pixel in concern, the filters possessing an identical edge detection characteristic and the pixel concern in each of the filters being set at a different location in the N-level gradation image;

an adding means for comparing output from each of the plurality of filters with a certain value, and adding the output only when it is greater than the certain value;

a judging means for comparing the added result from the adding means with a certain judgement level, and outputting the compared result as a judgement; and a recognizing means for recognizing a part of the image at which each of the filters is located as the edge area when the judgement outputted from the judging means is a first judgement, and recognizing it as the non-edge area when the judgement is a second judgement level.

13. The gradation level converting device of claim 12 further comprising:

a setting means for setting a plurality of processing modes, or an image quality adjustment value; and a first controlling means for controlling the certain judgement level according to a setting by the setting means.

14. The gradation level converting device of claim 11, wherein the area recognizing means comprises:

a plurality of first filters each of which detects an edge component of a pixel in concern as referring to a value of a pixel within an area including the pixel in concern, the filters possessing an identical edge detection characteristic and the pixel concern in each of the filters being set at a different location in the N-level gradation image;

a plurality of second filters which possess an identical edge detection characteristic which is different from the plurality of first filters, and the pixel in concern in each of the filters is set at a different location in the N-level gradation image;

a first adding means for adding the detected result outputted from each of the plurality of first filters;

a second adding means for adding output from each of the plurality of second filters;

a first judging means for comparing the added result outputted from the first adding means with a first judgement level, and outputting the compared result as a judgement;

a second judging means for comparing the added result from the second adding means with a second judgement level, and outputting the compared result as a judgement; and an area recognizing means for recognizing whether a part of the image where the filter is located is the edge area or the non-edge area according to the judgements from the first judging means and the second judging means.

15. The gradation level converting device of claim 14 further comprising:

a setting means for setting a plurality of processing modes, or an image quality adjustment value; and a second control means for controlling validity of the judgement from one of the first judging means and the second judging means according to a setting by the setting means.

16. A device for converting input image data which is expressed by an N gradation level into image data which is expressed by an M gradation level (N<M), the device comprising:

a plurality of edge detecting means with different characteristics each for detecting an edge amount of the N-level gradation image data;

an extracting means for mixing the detected results outputted from each of the plurality of edge detecting means to generate an edge extraction amount;

a plurality of spatial filters for smoothing the N-level gradation image with different weighing coefficients or smoothing different smoothing areas of the N-level gradation image data;

a mixing means for normalizing the smoothed result outputted from each of the plurality of spatial filters, and mixing the normalized result with a certain mixing ratio according to the edge extraction amount outputted from the extracting means; and an outputting means for defining the mixed result outputted from the mixing means in the M gradation level, and outputting the defined result.

17. The device of claim 16, wherein the extracting means calculates the mixing ratio from the detected edge amounts from the plurality of edge detecting means, and generates the edge extraction amount by mixing the edge amounts based on the calculated mixing ratio.

18. The device of claim 16, wherein each of the plurality of spatial filters has an adding unit for adding a pixel in concern and pixels which are located around the pixel in concern of the N-level image based on the weighing coefficient or the size of the smoothing area.

19. The device of claim 16, wherein the mixing means has a normalizing unit for normalizing the outputs according to a sum of the weighing coefficients and the gradation level N.

* * * * *